US012769774B1

(12) United States Patent
Bran et al.

(10) Patent No.: US 12,769,774 B1
(45) Date of Patent: Oct. 20, 2026

(54) DYNAMIC CONTEXT GENERATION

(71) Applicant: Reputation.com, Inc., San Ramon, CA (US)

(72) Inventors: Cary A. Bran, Vashon, WA (US); Shantanu Sarkar, San Jose, CA (US); Joe Burton, Monte Sereno, CA (US); Carlos A. Kemeny, Pleasant Grove, UT (US)

(73) Assignee: Reputation.com, Inc., San Ramon, CA (US)

( * ) Notice: Subject to any disclaimer, the term of this patent is extended or adjusted under 35 U.S.C. 154(b) by 0 days.

(21) Appl. No.: 19/397,347

(22) Filed: Nov. 21, 2025

Related U.S. Application Data

(60) Provisional application No. 63/775,489, filed on Mar. 21, 2025.

(51) Int. Cl.
*G06F 16/3329* (2025.01)
*G06F 16/387* (2019.01)
*G06F 40/30* (2020.01)

(52) U.S. Cl.
CPC ...... *G06F 16/33295* (2025.01); *G06F 16/387* (2019.01); *G06F 40/30* (2020.01)

(58) Field of Classification Search
None
See application file for complete search history.

(56) References Cited

U.S. PATENT DOCUMENTS 12,531,056 B1 * 1/2026 Liu ........................ G10L 15/16

OTHER PUBLICATIONS

Katsiuba, et al. “Supporting Online Customer Feedback Management with Automatic Review Response Generation,” HICSS, 2022. (Year: 2022).*
Chen, et al. “Evaluation of fresh food logistics service quality using online customer reviews,” International Journal of Logistics, 2021. (Year: 2021).*
Wu, et al. “Second Place Solution of WSDM2023 Toloka Visual Question Answering Challenge,” arXiv, 2024. (Year: 2024).*
Minnegalieva, et al. “Automated Grading of Students' Short Answers Using Language Models,” Automatic Documentation and Mathematical Linguistics, 2024 (Year: 2024).*
Zhang, et al. “A weighted adaptation method on learning user preference profile,” Elsevier, 2016. (Year: 2016).*
Resendiz, Yarik Menchaca, and Roman Klinger. “Emotion-conditioned text generation through automatic prompt optimization.” Proceedings of the 1st Workshop on Taming Large Language Models: Controllability in the era of Interactive Assistants!. 2023.*
Sheilsspeigh, Patrick, et al. “Dynamic context shaping: A new approach to adaptive representation learning in large language models.” Authorea Preprints (2024).*

(Continued)

*Primary Examiner* — Paras D Shah
(74) *Attorney, Agent, or Firm* — Van Pelt, Yi & James LLP

(57) ABSTRACT

Sentiment content is received. Dynamic context is generated based at least in part on the sentiment content and location-based information. The dynamic context is output, where a generative AI tool generates response content based at least in part on the dynamic context and the sentiment content.

18 Claims, 11 Drawing Sheets

(56) References Cited

OTHER PUBLICATIONS

Baumann, Jill, and Oliver Kramer. "Evolutionary multi-objective optimization of large language model prompts for balancing sentiments." International conference on the applications of evolutionary computation (part of evoStar). Cham: Springer Nature Switzerland, 2024.*
Woźniak, Stanisław, et al. "Personalized large language models." 2024 IEEE International Conference on Data Mining Workshops (ICDMW). IEEE, 2024.*
Author Unknown, 25 Use Cases for Generative AI In Customer Service, CX Today, Aug. 28, 2024, https://www.cxtoday.com/contact-center/20-use-cases-for-generative-ai-in-customer-service/.
Author Unknown, AI Review Responses: A How-to Guide, GatherUp, Jul. 29, 2024, https://gatherup.com/blog/ai-review-responses/.
Author Unknown, Assigning Roles, Learn Prompting, Aug. 7, 2024, https://learnprompting.org/docs/basics/roles.

* cited by examiner

Example of Dynamic Context that includes a Dynamic Role Directive (200)

*"You are a customer service representative responding to a customer review of the Pancakes and More chain. The customer review is specifically about the Pancakes and More location in Lexington, Kentucky, so your response should reflect local pride, Southern hospitality, and the welcoming vibe the Pancakes and More brand is known for. Use a warm, approachable tone with a touch of Lexington charm. Address the recent food quality issues at the Lexington, Kentucky location and any feedback with genuine care while highlighting the friendly service and community feel."*

FIG. 2

DYNAMIC CONTEXT GENERATION

CROSS REFERENCE TO OTHER APPLICATIONS

This application claims priority to U.S. Provisional Patent Application No. 63/775,489 entitled DYNAMIC ROLE DIRECTIVES FOR GENERATED RESPONSES filed Mar. 21, 2025 which is incorporated herein by reference for all purposes.

BACKGROUND OF THE INVENTION

Context setup (or, more simply, context) in prompt engineering establishes (as an example) a generative AI (GenAI) tool's persona (sometimes referred to herein as a role directive), goals, and/or communication style to guide the output. Although using context (e.g., a role directive) in combination with a GenAI tool is known, new techniques which produce better-quality context which in turn produce better-quality GenAI outputs would be desirable. For example, better-quality GenAI outputs (that are produced by such better-quality context) may reduce the likelihood and/or the severity of a hallucination and/or undesirable content in the GenAI output.

BRIEF DESCRIPTION OF THE DRAWINGS

Various embodiments of the invention are disclosed in the following detailed description and the accompanying drawings.

FIG. 2 is a diagram illustrating an embodiment of a dynamic role directive that is included in dynamic context.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique to generate dynamic context are described herein. In some embodiments, dynamic context is generated based at least in part on sentiment content (e.g., a customer review, survey, etc. about a business, store location, product, etc.) where the dynamic context is passed to a GenAI tool to generate a (e.g., proposed and/or suggested) response to the sentiment content.

The following figure shows an exemplary online brand management system which generates dynamic context and feeds the dynamic context into a GenAI tool to generate response content. It is noted that different GenAI tools have different capabilities and likewise there may be different applications and/or usage scenarios in which an online brand management system is used. Depending upon the specific capabilities of the GenAI tool and/or the specific application scenario, different configurations and/or techniques may be employed and/or desirable. To put it another way, the following figure is merely exemplary and is not intended to be limiting.

Figure 1:
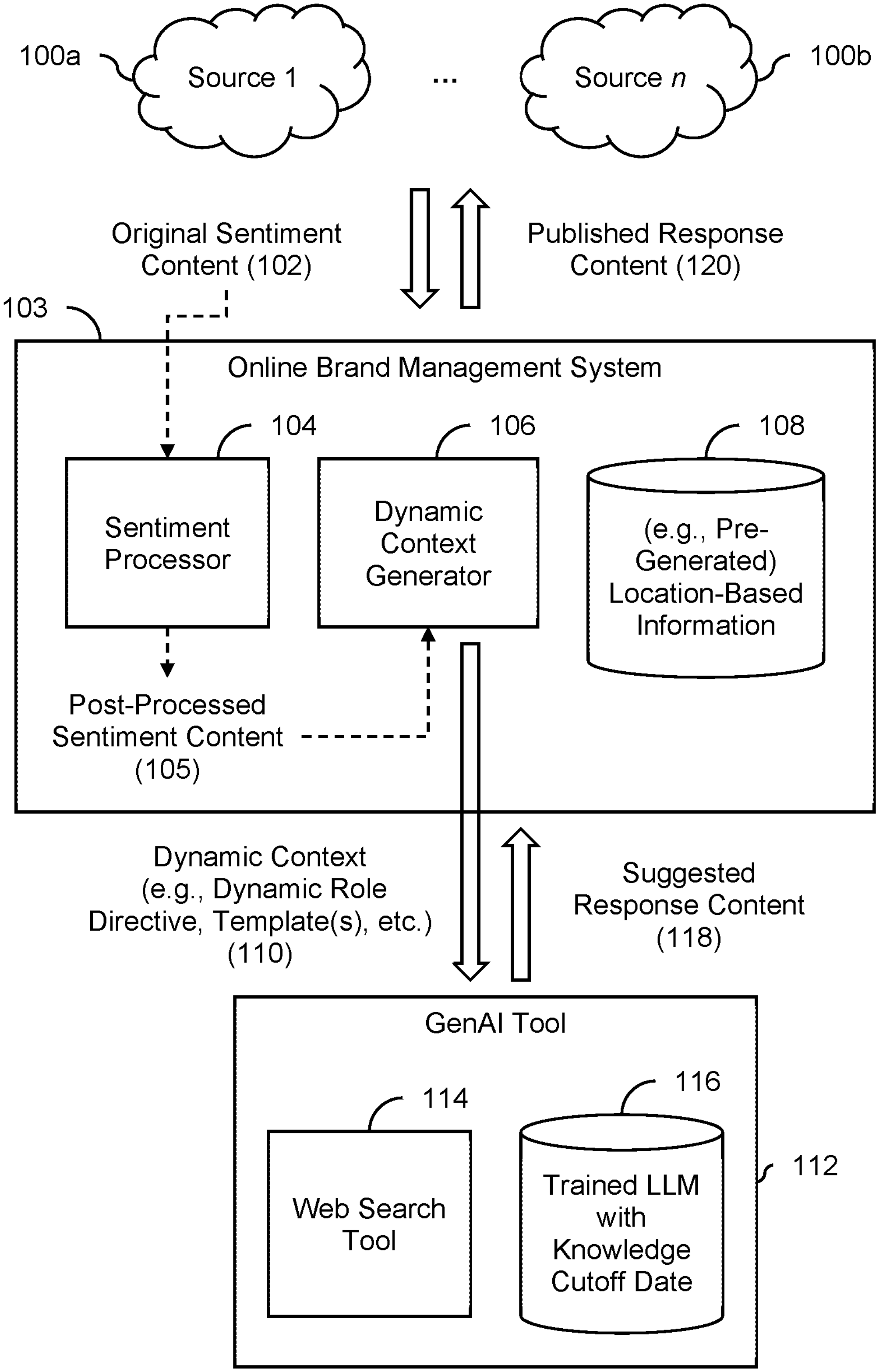
FIG. 1 is a diagram illustrating an embodiment of an online brand management system which generates dynamic context which in turn is used to generate response content using a GenAI tool.

FIG. 1 is a diagram illustrating an embodiment of an online brand management system which generates dynamic context which in turn is used to generate response content using a GenAI tool. In this example, a user of the online brand management system (103) may be responsible for responding to customer reviews or feedback (or more generally referred to herein as "sentiment content"). In a franchise and/or chain business model where there are many stores and/or locations, such a user may be a customer service representative. Alternatively, in a "mom and pop" or other scenario with one or only a few stores, the user may be the business owner or store manager.

In this example, the online brand management system (103) communicates with and/or monitors n sources (100*a*-100*b*) for original, raw, and/or native sentiment content (102). For example, when a new customer-generated event occurs (e.g., a new Google review of a particular business is posted to Google), the online brand management system (103) obtains original sentiment content (102), for example, by using sentiment processor (104). Alternatively, a third-party monitoring service may be employed to monitor the n sources (100*a*-100*b*) and deliver content to the online brand management system (103). A variety of interfaces (e.g., API), technologies (e.g., push vs. pull), etc. may be used to obtain or otherwise collect the original sentiment content (102) from the sources (100*a*-100*b*) and for brevity are not described herein.

In some embodiments, the original sentiment content (e.g., 102) is from and/or is associated with a (e.g., customer) review, survey, feedback, impression, and/or recounting of an experience, interaction, product sold by the business or store, and/or other aspects of a business or store (e.g., bathrooms, parking, cleanliness, promptness, friendliness, etc.). In various embodiments, sentiment content comes in a variety of forms and/or media formats, such as text, video, and/or voice. In various embodiments, sentiment content may be available from a variety of sources (sometimes referred to as channels), including social media, websites and/or apps that contain reviews, comments or reviews on a product page (e.g., the product page for a moisturizer on a website and/or webstore), a podcast, etc.

Correspondingly, some examples of sources (100*a*-100*b*) are: social media websites and/or channels (e.g., YouTube, X (formerly known as Twitter), Instagram, etc.), review-containing and/or review-oriented websites and/or channels (e.g., Yelp, Google Maps, etc.), a manufacturer or retailer's website and/or webstore (e.g., for the moisturizer example above, CeraVe, Sephora, etc.), a podcast distributor or provider, etc.

Returning to the example of FIG. 1, the sentiment processor (104) in the online brand management system (103) is responsible (at least in this example) for processing the original sentiment content (102) and generating post-processed sentiment content (105). Some examples of the processing that may be performed by a sentiment processor (e.g., 104) include:

- Relevance Checking: In some embodiments, a sentiment processor (e.g., 104) determines whether a given instance of original sentiment content (102) is relevant and/or of interest to the online brand management system (103). For example, suppose a franchise owner that owns some but not all stores of a franchise in a metro area or state is a user and/or customer of the online brand management system (103). In one example, a sentiment processor may determine whether a given instance of original sentiment content (102) is relevant (e.g., a review that is directed to one of the store locations owned by the franchise owner) or not (e.g., a review that is directed to a store location that is not owned by the franchise owner).
- Dynamic Context Required? In some embodiments, a sentiment processor (e.g., 104) determines whether a given instance of original sentiment content (102) requires or otherwise needs dynamic context. For example, if the original sentiment content (102) does not require a response, or if such a response can be generated without dynamic context (e.g., a prompt for the GenAI tool (112) of "generate a reply to <sentiment content>" is sufficient without dynamic context), then it may be faster and/or conserve resources to not generate the (e.g., extraneous) dynamic context.
- Common or Standardized Format: The original sentiment content (102) may come in a variety of formats (e.g., audio, video, text, etc.) and/or contain different types of metadata or fields. In some embodiments, the original sentiment content (102) and/or sources (100*a*-100*b*) is/are processed or otherwise extracted into a common or standardized format which is subsequently used to generate dynamic context (110). This may include (e.g., where the dynamic context includes a (dynamic) role directive such as a customer/reviewer persona):
  - Machine learning techniques performed across modalities, types of media, and/or sources of sentiment content. By leveraging these techniques individually or in combination, businesses can gain deeper insights into the emotional drivers and tone underlying customer feedback across diverse media formats;
  - For text-based sentiment content, using Natural Language Processing (NLP) models such as BERT and/or GPT to analyze sentiment and tone by interpreting language patterns and context;
  - For audio-based sentiment content, using speech analysis that focuses on acoustic features such as pitch, rhythm, and/or intensity (e.g., deep learning models like Wav2Vec 2.0 and spectrogram-based CNNs may be good at capturing emotional nuances); and/or
  - For video-based sentiment content, using a multimodal approach that combines facial expression recognition using CNNs, speech emotion analysis, and/or NLP on transcribed content to create a comprehensive understanding of customer sentiment.
- Anonymized/Privacy Protection: The original sentiment content (102) may contain sensitive, identifying, and/or private information which is filtered to produce (e.g., anonymized, redacted, etc.) post-processed sentiment content (105). For example, in some industries such as healthcare, privacy protection is an important consideration, and processing may include removing sensitive and/or protected information. Some examples include:
  - an instruction to refer to a disease and/or medical condition and/or identify it by name (e.g., say "your condition" versus "your <disease/condition>" in the response); and/or
  - an instruction to anonymize a name (e.g., use first name only and no last names, or use no names at all)); and/or
  - an instruction to generalize location information (e.g., don't use their street address, just city), etc.
- Sentiment Analysis: In some embodiments, sentiment analysis (e.g., using a convolutional neural network (CNN), etc.) is performed to identify or classify feeling, emotions, and/or sentiments, for example, expressed by a reviewer and/or in the original sentiment content (102). For example, if a customer has a neutral tone versus an extremely upset tone, the resulting dynamic context will be different to craft responses that are better suited for those different situations.

Returning to the example of FIG. 1, the post-processed sentiment content (105) is passed from the sentiment processor (104) to the dynamic context generator (106). In this example, the dynamic context generator (106) uses post-processed sentiment content (105) and location-based information (108) to generate dynamic context (110).

For example, suppose that one customer review has a negative review but the tone is neutral (or at least calm, dispassionate, etc.) and another customer review (also negative) has a much more upset or emotional tone. The dynamic context that is generated will be different for the former versus the latter. It would be undesirable to respond to those two customer reviews with the same tone and/or response; having different dynamic context enables different responses to be generated that are better suited for each scenario (e.g., neutral vs. very upset). In the example of FIG. 1, the dynamic context generator (106) generates the dynamic context (110) without the aid and/or use of GenAI tool (112).

Alternatively, in some embodiments, the dynamic context generator (106) selects appropriate inputs and/or prompts and feeds them into the GenAI tool (112) which then outputs dynamic context (110). This dynamic context (110) may then be used by GenAI tool (112) (e.g., feeding the dynamic context (110) back into the GenAI tool (112), as or if needed) to generate the suggested response content (118).

For brevity, some examples described herein say that dynamic context is generated based at least in part on sentiment content. It is to be understood that this includes post-processed sentiment content (e.g., 105) in some embodiments and/or original sentiment content (e.g., 102) in some embodiments.

As used herein, the term "dynamic context" means that the context is dynamic, because and/or characterized by the variation from one instance of context to another, whereas (e.g., unspecific and/or generic) context is not necessarily dynamic. More specifically, this is due to the dependence (at least in some embodiments) of the dynamic context on the sentiment content, which (in some embodiments) will vary based on the type of media and/or format of the sentiment content, the content and/or intrinsic data from the sentiment content, inferred emotions and/or tone of the sentiment content, and/or location-based information (described in more detail below). Other techniques do not necessarily generate dynamic context (i.e., that are dynamic) and/or such other techniques do not necessarily use the same data and/or inputs to generate dynamic context. Examples of other and/or additional inputs and/or data that may be used to generate dynamic context are described in more detail below.

In this example, location-based information (108) describes, specifies, and/or is otherwise associated with a relevant location, such as the location, neighborhood, city, etc. of a store or business that the original sentiment content (102) is directed to. In some embodiments, the location-based information (108) is (pre-)generated as part of an onboarding or intake process for a user (e.g., a franchise owner, a business owner, etc.) by the online brand management system (103). In some embodiments, the online brand management system (103) automatically determines the location-based information (108), for example, based on the location specified on a review-oriented website (e.g., a location listed in Yelp, Google Maps, etc.) or a business's website or social media presence. In some embodiments, a user (e.g., a franchise owner, a business owner, etc.) provides or otherwise specifies the location-based information (108) (e.g., specifies the city or neighborhood that should be used). For example, this latter scenario may be appropriate if a business has an office or depot in one city or neighborhood but tends to provide service or sell in another city or neighborhood.

In one example of location-based information (108), suppose a user of the online brand management system (103) is a franchise owner with a store located in San Jose. San Jose has different neighborhoods with different demographics and therefore the location-based information (108) may describe the specific neighborhood the franchise location in question is located (at least in this example). For example, by having the location-based information (108) specify the Downtown San Jose neighborhood (with many more San Jose State University students than other neighborhoods) versus the West San Jose neighborhood (which is more affluent than other neighborhoods), the dynamic context may be better tuned to produce a (e.g., review) response that is better received by, more appropriate for, and/or better tuned to the reviewer.

To generate the suggested response content (118), the GenAI tool (112) performs the following steps (at least in this example):

1) Data Ingestion: Aggregate sources (e.g., reviews, brand guidelines, and/or location data).
2) Retrieval: Use a vector retriever to pull relevant persona insights.
3) Transformation: Apply NLP and machine learning models to extract traits and align them into a persona schema.
4) LLM Directive Generation: feed the transformed data into an LLM with a RAG-enhanced prompt.

In addition to the dynamic context (110), other prompts and/or inputs (not shown) may be fed into the GenAI tool (112) to generate suggested response content (118). For example, a prompt to "generate a reply to <sentiment content>" may follow an earlier prompt to "read <dynamic context>".

Once the suggested response content (118) is generated, the online brand management system (103) may create an association between the suggested response content (118) and the original sentiment content (102) and save the association for future use. As an example of how such a saved association may be used, the online brand management system (103) may use the association to present the suggested response content (118) side-by-side in a user interface with the original sentiment content (102) for a user to edit, approve, post, and/or send the approved response content (120). As will be described in more detail below, in some cases and/or for some types of sources, it may be very important to respond promptly to a review or other sentiment content (e.g., a negative review posted on social media channels), and so (quickly) prompting or otherwise notifying a user of the online brand management system (103) may be an important part of responding promptly to a review or other (original) sentiment content (e.g., 102).

Alternatively, in some embodiments, there is no user intervention and/or review, and the suggested response content (118) is the same as the approved response content (120), and the saved association is used to automatically post and/or send the response content (118/120) to the appropriate review or survey (e.g., original sentiment content (102)) on the appropriate source and/or via the appropriate channel.

Returning briefly to the GenAI tool (112), in this example, the GenAI tool (112) is a third-party tool that is not part of the online brand management system (103) in the exemplary block diagram. Alternatively, in some embodiments, a proprietary and/or in-house GenAI tool is used which is integrated into the exemplary online brand management system (not shown in FIG. 1).

In this example, the GenAI tool (112) includes a web search tool (114) and a trained large language model (LLM) (116). The trained LLM (116) has a knowledge cutoff date beyond which the trained LLM has no knowledge and/or information. The web search tool (114) supplements the missing information between the knowledge cutoff date and the present by searching the web. In some other embodiments (not shown here), a GenAI tool only includes a trained LLM (having some knowledge cutoff date) without a web search tool. In such embodiments where the GenAI tool lacks web search capabilities, the example shown in FIG. 1 may be supplemented by (as an example) an indexed output from a recent web search.

It is noted that the techniques described herein are agnostic as to the specific GenAI tool (112) and a variety of GenAI tools may be employed, making the techniques described herein attractive across a variety of applications. For example, some GenAI tools may be preferred over other GenAI tools due to a variety of factors including: cost constraints, direct or indirect conflict or competition with a parent company of a GenAI tool, features or capabilities of a GenAI tool such as privacy considerations (e.g., do-not-train-on/do-not-store guarantees), data ingestion and/or internal storage capabilities, license limitations, cost, etc.

One problem with using GenAI tools to generate response content is that some other implementations (i.e., different from the techniques described herein) have too much variation in their response. Some degree of variation is desirable in GenAI-generated response content because published response content that is too identical may be flagged as a bot or spam, causing the flagged response content to be removed or otherwise filtered out. However, other techniques (i.e., different from the techniques described herein) have too much variation or variability, which is undesirable. For example, GenAI-generated response content (e.g., generating using some other technique) with "too much variation" may cross some line, such as violating a law or regulation (e.g., related to online privacy, health information protections, protection of minors, etc.), contains a hallucination, and/or may not be permitted by risk managers (e.g., lawyers, a legal department, etc.) without human review.

In many applications, the sheer number of sentiments (e.g., reviews) that are posted and the often short turnaround times required (e.g., to better ensure that a reviewer sees a published response before changing (e.g., social media) channels and/or turning their attention elsewhere, to reduce the ripple effect of a negative review on social media, etc.) mean that human review of GenAI-generated response content is not a feasible solution. To put it another way, other techniques fail to solve the technical problem of being able to: (1) use GenAI to generate response content, (2) operate without human review of the GenAI-generated response content, and (3) operate with an acceptable amount of variation in the GenAI-generated response content (e.g., with some degree of variation, but not too much variation where an undesirable and/or line-crossing response is generated and automatically published).

In contrast, the techniques described herein are able to solve the technical problem of satisfying all three conditions recited above (i.e., (1) able to use GenAI to generate response content, (2) doesn't need or otherwise require human review of the GenAI-generated response content, and (3) there is some but not too much variation). As will be described in more detail below, in various embodiments, this is achieved by using one or more (e.g., approved) templates, selecting input components from a library of input components, and/or including or otherwise using an objective function.

In some applications, there is a need to minimize turnaround time (i.e., latency, such as between receipt of the original sentiment content (102) and the (e.g., automatically posted or human-reviewed) published response content (120)). For example, in some social media applications, it may be desirable for this turnaround time to be on the order of a few seconds. This need for a speedy turnaround time (while still generating a better (e.g., more tailored, nuanced, and/or effective) response using a dynamic role directive) may come up against multiple factors that work against this design objective, including:

- The dynamic role directive is generated based on (e.g., original and/or post-processed) sentiment content, so processing cannot begin until the sentiment content is received.
- Many GenAI tools tend to be slow.
- The online brand management system may be managing massive amounts of data (e.g., across all users or businesses that use the online brand management system). For example, the online brand management system may be dealing with hundreds of millions of review responses, plus the corresponding reviews that prompted those responses.

To ensure that a dynamic role directive is generated quickly (and thus the total turnaround time is minimized), in some embodiments, information (e.g., location-based information (108)) is pre-generated (e.g., before original sentiment content (102) is received). This reduces the amount of information that must be processed in real time (e.g., when original sentiment content (102) is received, kicking off generation of the dynamic role directive (110)).

In some embodiments, pre-generating information (e.g., location-based information (108)) includes filtering information so that the amount of stored information is relatively small and/or formatting or otherwise preparing the information so that it can be quickly and/or easily ingested by the dynamic role directive generator (106).

As will be described in more detail below, other types of information that is/are used to generate a dynamic role directive may similarly be pre-generated and/or pre-processed (e.g., before original sentiment content (102) is received) in a manner that uses less storage, enables faster ingestion, and/or otherwise improves the performance of the system. Occasionally, the information (e.g., location-based information (108)) that is used to generate a dynamic role directive may be updated, but in general this information is relatively static.

Some other systems may use workers in countries with lower labor costs outside of the United States to respond to reviews and other sentiment content. One problem with this is foreign workers may have difficulty generating a response that follows brand guidelines and/or has the "tone" of a local. For example, a worker in Mumbai, India instructed to reply with "Lexington charm" or "Southern hospitality" will probably struggle with crafting a response with those guidelines. Furthermore, it will probably take that worker a noticeable amount of time to write such a response. In contrast, with the techniques described herein, response content can be generated that follows brand guidelines and/or is tuned to the local region (as an example) while still quickly generating the response content.

It may be helpful to show an example of dynamic context that includes a dynamic role directive. The following figure shows one such example.

FIG. 2 is a diagram illustrating an embodiment of a dynamic role directive that is included in dynamic context. The exemplary dynamic role directive (200) shown here is one example of a type of dynamic context that may be generated by a dynamic context generator (e.g., 106 in FIG.

1) and/or is used by a GenAI tool (e.g., 112 in FIG. 1) to generate (e.g., suggested) response content (e.g., 118 in FIG. 1).

In this example, the dynamic role directive (200) says, "You are a customer service representative responding to a customer review of the Pancakes and More chain. The customer review is specifically about the Pancakes and More location in Lexington, Kentucky, so your response should reflect local pride, Southern hospitality, and the welcoming vibe the Pancakes and More brand is known for. Use a warm, approachable tone with a touch of Lexington charm. Address the recent food quality issues at the Lexington, Kentucky location and any feedback with genuine care while highlighting the friendly service and community feel."

In this example, the business is a chain with multiple locations and a user of an online brand management system is a franchise owner that owns some locations or stores of that chain. Returning briefly to the example of FIG. 1, the location-based information (108) may be pre-generated or otherwise pre-computed since the locations of interest are known ahead of time (e.g., the neighborhoods, cities, and/or metropolitan regions where the franchise owner and user of the online brand management system has locations or stores, but not where the franchise owner/user does not have locations or stores).

To generate the dynamic role directive (200) shown in FIG. 2, the location-based information (108) in FIG. 1 may include a location of "Lexington, Kentucky" and/or "the South." In some embodiments, location-based information (108) includes tones, personas, traits, and/or characteristics that are associated with a location. These types of location-based information may produce or otherwise result in the "local pride, Southern hospitality" and "warm, approachable tone with a touch of Lexington charm" in the dynamic role directive (200). Location-based information may also enable the detection and/or inclusion of "the recent food quality issues at the Lexington, Kentucky location" in the dynamic role directive (200).

In this example, the dynamic role directive (200) is directed to the persona of a review responder (e.g., "You are a customer service representative . . . "). In some other embodiments (not shown here), a dynamic role directive includes the persona of the reviewer to whom the response content is directed to (e.g., in addition to and/or as an alternative to a dynamic role directive that includes a review responder persona). Because the tastes and opinions of customers (e.g., reviewers) can change over time (e.g., overnight in some cases), it may be important in some applications for GenAI-generated response content to reflect the current sentiment and/or persona of the customer.

In some embodiments, supplemental location-based information is obtained or otherwise extracted from the original and/or post-processed sentiment content. For example, suppose the Pancakes and More chain is very popular in certain regions (e.g., the Midwest and South) and a franchise owner has multiple stores or locations in a particular city or town. In some embodiments, supplemental location-based information is extracted from the original and/or post-processed sentiment content (e.g., the specific location and thus a more precise location around that store) which is included in or otherwise used to generate a dynamic role directive. To put it another way, in some embodiments, (e.g., pre-generated) location-based information may include information for all locations of interest (e.g., all areas where a particular franchise owner has a store or location) and this information is narrowed or more precisely targeted based on the original and/or post-processed sentiment content.

It may be helpful at this point to put some of the techniques described above into a flowchart. The following figure shows an example process for generating a dynamic role directive.

Figure 3:
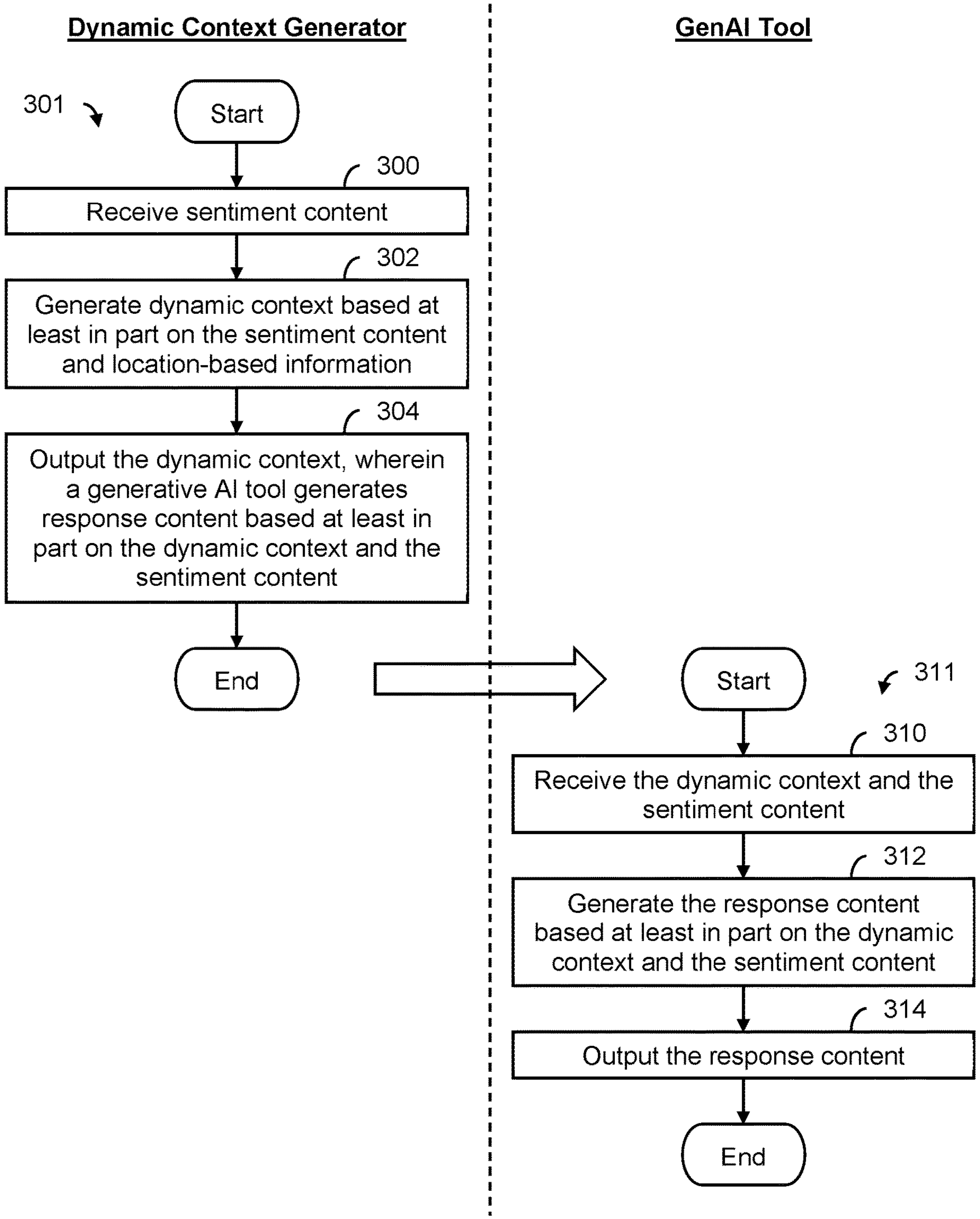
FIG. 3 is a flowchart illustrating an embodiment of related processes to generate a dynamic context and to generate response content using the dynamic context.

FIG. 3 is a flowchart illustrating an embodiment of related processes to generate a dynamic context and to generate response content using the dynamic context. In this example, the exemplary process on the left (301) is performed by a dynamic context generator (e.g., 106 in FIG. 1) and the related exemplary process on the right (311) is performed by a GenAI tool (e.g., 112 in FIG. 1).

At 300, sentiment content is received.

As described above, in some embodiments, the sentiment content is received (e.g., at 300) via a third-party monitoring service that monitors a plurality of sources.

As described above, in some embodiments, the sentiment content that is received (e.g., at 300) includes original sentiment content. A process for generating and/or outputting dynamic context (e.g., 301) further includes generating post-processed sentiment content using the original sentiment content, including by performing one or more of the following: checking relevance based at least in part on ownership of a store location, deciding whether dynamic context should be generated, applying a standardized format, removing identifying or sensitive information, or performing sentiment analysis, wherein the post-processed sentiment content is used to generate the dynamic context (e.g., at 302).

At 302, dynamic context is generated based at least in part on the sentiment content and location-based information. For example, a very long and/or detailed instance of negative dynamic context (i.e., that expresses a negative experience or impression) will result in different dynamic context compared to a brief instance of negative dynamic context (e.g., due to the different lengths and/or levels of detail). Or, in another example, if one instance of sentiment content uses proper capitalization, punctuation, and/or grammar and another instance of sentiment content uses more slang and/or improper grammar, different dynamic context is generated (e.g., due to the differences in usage of slang and/or proper grammar).

In some embodiments, dynamic context (e.g., generated at 302) includes a dynamic role directive associated with one or more of the following: a persona, job, or role (e.g., a hypothetical person from whom the suggested response content is supposed to come from). FIG. 2 shows one example of a dynamic role directive (200).

In some embodiments, dynamic context (e.g., generated at 302) includes a (e.g., human-reviewed and/or approved) template (e.g., from which suggested response content is generated by a GenAI tool). In some embodiments, such templates are approved by someone in a supervisory role and/or with a good understanding of undesirable GenAI hallucinations (e.g., a social media director, lawyer, etc.). As will be described in more detail below, in some embodiments, there are multiple (e.g., approved) templates where each template corresponds to a different emotion, mood, and/or feeling (e.g., expressed by a given instance of sentiment content). For example, there may be one template for "positive" sentiment content. Correspondingly, there may be a second, negative template for "negative" sentiment content.

In some embodiments, dynamic context (e.g., generated at 302) includes (1) one or more input components that are selected from a library (of input components) and (2) a value (e.g., a weight, coefficient, score, etc.) for each of the selected input components, where the selected input components and their associated values are input to the GenAI tool. Conceptually, each input component describes and/or represents some characteristic, property, factor, and/or limitation that the GenAI tool attempts to satisfy or otherwise achieve to the degree and/or amount specified by the corresponding value. More detailed examples of input components are described below.

In some embodiments, dynamic context (e.g., generated at 302) includes an objective function. Conceptually, an objective function produces different values for different potential response content and is used by the GenAI tool to select or otherwise identify the best (e.g., optimal) response content. In some embodiments, an objective function is used in combination with input components that are selected from a library (e.g., the selected input components are used to populate the objective function).

In some embodiments, the location-based information (e.g., used at step 302) is pre-generated (e.g., before the location-based information is received). In some embodiments, the location-based information includes one or more languages (e.g., used in the sentiment content, or for which response content should or otherwise will be generated). For example, if the location is Canada, local laws may require both English and French and a "response language(s)" field (as an example) in the location-based information may (e.g., always) include English and French (e.g., even if the sentiment content only used English). Alternatively, if the location is the United States, typically there is no local law requiring certain languages to be used and (if so) a "response language(s)" field in the location-based information may be set to whatever language the sentiment content was written and/or spoken in.

In some embodiments, generating a dynamic context (e.g., at step 302) includes processing original sentiment content (e.g., 102 in FIG. 1) to obtain post-processed sentiment content (e.g., 105 in FIG. 1) and the dynamic context is generated based at least in part on the post-processed sentiment content.

At 304, the dynamic context is output, wherein a generative AI tool generates response content based at least in part on the dynamic context and the sentiment content. For example, in FIG. 1, the online brand management system (103) outputs a dynamic context (110) which is then passed to GenAI tool (112) which generates suggested response content (118) based on the dynamic context (110) and sentiment content (e.g., original (102) and/or post-processed (105) in FIG. 1).

At the GenAI tool, the dynamic context and the sentiment content are received at 310.

At 312, the response content is generated based at least in part on the dynamic context and the sentiment content.

At 314, the response content is output.

In some embodiments, the response content (e.g., output at 314) comprises suggested response content (e.g., 118 in FIG. 1) that is presented via a user interface for an online brand management system (e.g., 103 in FIG. 1). Via such a user interface, a (human) user may review, approve, and publish the suggested response content as published response content (e.g., 120 in FIG. 1). Alternatively, in some other embodiments, the dynamic context that is fed into the GenAI tool sufficiently constrains the GenAI to produce response content that is accurate, safe, and/or otherwise "within bounds" and the response content (e.g., output at 314) is automatically published (e.g., without human review).

As described above, in some embodiments, dynamic context is generated based on input components that are selected from a library of input components. The following figure describes an example of this.

Figure 4:
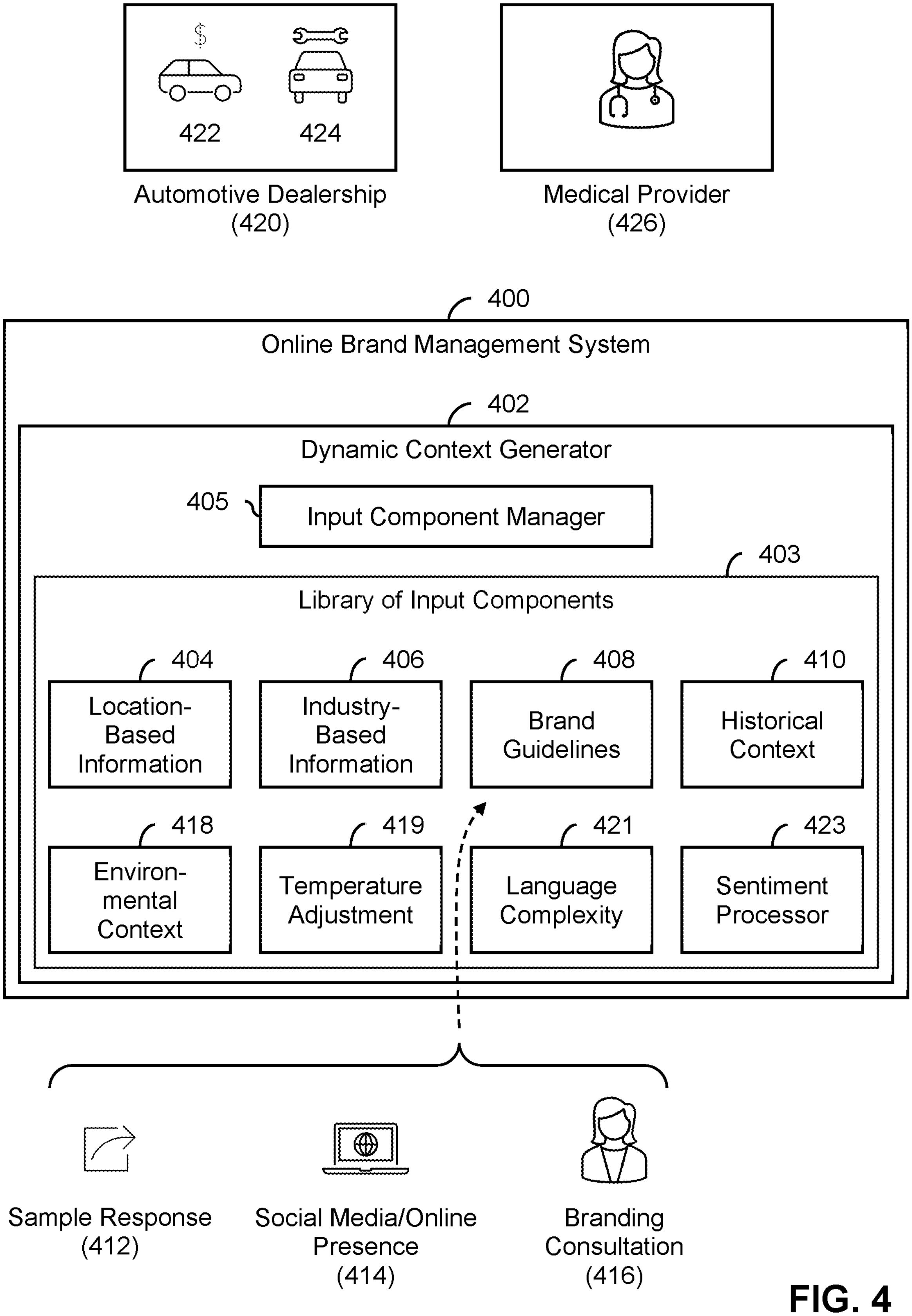
FIG. 4 is a diagram illustrating an embodiment of an online brand management system which generates dynamic context using a library of input components.

FIG. 4 is a diagram illustrating an embodiment of an online brand management system which generates dynamic context using a library of input components. In this example, an online brand management system (400) includes a dynamic context generator (402) which generates dynamic context (not shown) using a library of input components (403).

It is to be understood that this example is merely illustrative and is not intended to be limiting. To put it another way, some other embodiments may not necessarily use the same combination and/or types of input components to generate dynamic context as shown here. Furthermore, some system components and/or modules which were previously described above are not shown herein for brevity and to preserve the readability of the figure.

In this example, two reviewees (e.g., users of the online brand management system (400)) are shown: an automotive dealership (420), which includes automotive sales (422) and automotive service (424), and a medical provider (426). The reviewees (420 and 426) are used to illustrate this example of how a library of input components (403) may be used to generate dynamic context.

An input component manager (405) selects one or more input components from the library (403) to use in generating dynamic context. In this example, the selection of input components is based at least in part on the given instance of sentiment content (e.g., raw/original or filtered/processed). In addition to selecting input components from the library (403), the input component manager (405) is also responsible for updating already-existing input components in the library (as or if needed), adding new kinds or types of input components to the library (as or if needed), etc.

In various embodiments, an input component includes a criteria, characteristic, property, standard, factor, type of information, method, and/or a technique or process which is used to generate dynamic context. In this example, the library of input components (403) includes location-based information (404), industry-based information (406), brand guidelines (408), historical context (410), environmental context (418), temperature adjustment (419), language complexity (421), and a sentiment processor (423). In this example, at least some of the input components in the library (403) are pre-generated and/or relatively static.

In this example, industry-based information (406) includes an identification and/or classification of the relevant industry that a reviewee is in. For example, there may be a collection of pre-defined industries and one or more relevant ones that a reviewee (e.g., 420 and 426) falls into are selected and included in the (e.g., selected and/or used) industry-based information (406). For example, for automotive dealership (420), the industry-based information (406) may include a category or classification of "automotive sales" and "automotive service."

For the medical provider (426), the industry-based information (406) may include a category or classification of "medical services." Depending upon the application and/or embodiment, the industry-based information (406) may go as deep and/or as granular as desired. For example, for the medical provider (426), the industry-based information (406) may include a category or classification of "medical services" as well as more specific medical specialties and/or medical services such as "outpatient clinic" or "pediatric primary care."

In some embodiments, the value or type of an industry classification such as "medical services" or "automotive sales" (e.g., in or associated with industry-based information (406)) affects or is otherwise used to make a selection of an underlying sub-process or technique to generate dynamic context. For example, for medical services, it is very important to protect patient medical information and/or patient personal information. For automative sales, this is less of a concern. In one example, for more sensitive and/or risk-adverse industry classifications (e.g., "medical services"), safer and/or more risk-adverse dynamic context generation techniques may be selected (e.g., from a library of input components which includes generation techniques) or otherwise used. In one such example, (e.g., approved) template(s) are used, from which response content with relatively small tonal and/or grammatical variations is generated. This may be preferable to riskier generation techniques, such as non-template-based techniques, in which the GenAI tool is less constrained and thus has a higher likelihood of generating undesirable response content that violates patient privacy. For other types of industry classifications (e.g., "automotive sales" and/or with a greater tolerance for risk), some other dynamic context generation techniques may be used or otherwise selected (e.g., non-template-based techniques). To put it another way, with a template-based process to generate dynamic context, the degree of variance is much smaller (and/or is controlled or otherwise constrained) compared to the larger (and/or is uncontrolled or otherwise unconstrained) degree of variance for a non-templated-based process to generate dynamic context.

In some embodiments, an industry classification value (e.g., "medical services" or "automotive sales" in or associated with industry-based information (406)) is used to select, set, or otherwise determine a value associated with an input component (e.g., selected from the library (403)). For example, for an industry classification of "automotive service," a smaller radius (or, more generally, a (geographical) comparison area) for location-based information (404) may be set or otherwise used. Most people are not, for example, willing to drive very far for an oil change or scheduled service for their vehicle and it may be sufficient or acceptable for the online brand management system (400) to (only) take into account a smaller radius of local competitors. In contrast, for at least some types of medical services (e.g., cancer), people are willing to travel quite far and a larger radius (or, more generally, a comparison area) for location-based information (404) may be set or otherwise used.

Such a radius size or comparison area, associated with the location-based information (404), may specify an area or region to provide context and/or comparison in the generated response content. For example, for dynamic context that is generated from an industry classification of "automotive service" with a smaller radius (e.g., 10 miles), response context may be generated that says, "We are sorry you are upset about the cost of a major service for your vehicle, but within the Seattle metropolitan area, we offer the same or lower price compared to all other dealerships of <vehicle_make>." In contrast, for dynamic context that is generated from an industry classification of "cancer treatment" with a larger radius (e.g., 1000 miles), response context may be generated that says, "We are sorry you are upset about your wait time at our clinic, but our staff is in high demand because we are one of only three clinics in the Pacific and Mountain time zones offering that type of treatment, and the only one in California."

To describe the above example in another way, in some embodiments, dynamic context includes a comparison area having a position and a size (e.g., a radius, area, boundary, etc.); generating the dynamic context includes: setting the position of the comparison area using the location-based information (e.g., the location-based information includes the city that the automotive dealership (420) or medical provider (426) is located in and the position is set to that city) and setting the size of the comparison area using industry-based information (e.g., for an industry classification of "cancer treatment," set a larger radius, area, and/or boundary; for an industry classification of "automotive service," set a smaller size); the generative AI tool generates response content that provides context which is bounded by the position of the comparison area and the size of the comparison area (e.g., generates response content with context and/or comparisons limited to the position and size of the comparison area, without going beyond or outside of the specified comparison area).

Returning to the input components in the library (403), brand guidelines (408) include a description of and/or links to a brand guideline or other description of brand characteristics, etc. For example, this may include or otherwise be associated with a brand guideline, a corporate persona, and/or may include characteristics, attributes, tone, styles, and/or descriptors (e.g., playful, serious, Southern (US), casual, crisp, formal, etc.). In another example, some businesses refer to their customer-facing workers as "associates" (and not "employees"); in some embodiments, the brand guidelines (408) include preferred terms or phrases (e.g., "associates" instead of "employees") that should be used in (e.g., suggested) response content that is generated.

In this particular example, the automotive dealership (420) may be associated with a make that is either more luxury-oriented (e.g., Cadillac) or more every day and/or modest (e.g., Chevrolet). The brand guidelines may also be defined by a corporate entity (e.g., General Motors) and the brand guidelines (408) may include a copy of or link to corporate-defined brand guidelines (e.g., on an external source, such as a General Motors server or website, and prepared by General Motors marketing).

For other types of reviewees without the backing of a large corporation and/or substantial marketing resources, the source, length, and/or descriptiveness of the brand guidelines (408) may be different. For example, suppose the medical provider (426) is a small practice with limited time, money, and/or marketing expertise. In some embodiments, a sample response (412) to some review or other sentiment content is analyzed to generate brand guidelines (408) for the medical provider (426). For example, the medical provider (426) may select the best responses and/or the best writing that they feel best represents their "voice."

In some embodiments, a social media and/or other online presence (414) is analyzed to generate brand guidelines (408) for the medical provider (426). For example, this may include ingesting historic reviews or other feedback (e.g., on Yelp, Google, etc.) and the responses that have been provided are extrapolating to generate brand guidelines (408).

In various embodiments, the analysis of a sample response (412) and/or social media or other online presence (414) may be performed by a human and/or using automated techniques, such as generative AI.

In some embodiments, a branding consultation (416) is performed to obtain brand guidelines (408) for the medical provider (426). For example, this may be a one-on-one consultation between a branding consultant and a representative of the medical provider (426) to identify desired and/or representative characteristics or traits of the medical provider (426). In some embodiments, a branding consultation (416) includes some survey or questionnaire.

To put it more generally, in some embodiments, brand guidelines (408) are obtained from explicitly specified information, such as being written down in a policy document in the example of the automotive dealership (420). In some embodiments, brand guidelines (408) are inferred, such as by analyzing the sample response (412) and social media and/or online presence (414) in the example of the medical provider (426).

In some embodiments, brand guidelines (408) include one or more brand characteristics, metrics, dimensions, etc., each of which has a score or quantity associated with it. The following list illustrates one such example, where each brand characteristic is assigned a score between 0 and 10 (e.g., and the score or other value is passed to a GenAI tool along with the associated brand characteristic as part of the dynamic context):

1) Professional: Formal, authoritative, and trustworthy. Uses industry terminology appropriately and maintains a polished presentation.
2) Friendly: Warm, approachable, and conversational. Uses simple language and often incorporates first-person perspective.
3) Playful: Humorous, light-hearted, and entertaining. Uses wordplay, jokes, and casual language.
4) Inspirational: Motivational, uplifting, and future-focused. Uses emotive language and aspirational messaging.
5) Innovative: Forward-thinking, disruptive, and cutting-edge. Uses technical language and emphasizes novelty.

In some embodiments, an analysis of the sample response (412), social media and/or other online presence (414), and/or branding consultation (416) produces scores or values for the above exemplary brand characteristics which are included in brand guidelines (408) for that reviewee (i.e., medical provider (426)). In some embodiments, such an analysis uses a GenAI tool to produce scores. Similarly, for the exemplary automotive dealership (420), a corporate-defined brand guideline may be analyzed to generate scores or values for one or more brand characteristics for use as or in brand guidelines (408) for that reviewee (i.e., automotive dealership (420)).

Although some example techniques and/or concepts may be described in this example in association with brand guidelines (408), in some embodiments those techniques are used to generate other types of information (e.g., 404, 406, etc.) which in turn are used to generate dynamic context. For example, a sample (e.g., historic) response (412) and/or a social media and/or other online presence (414) may be analyzed to generate historical context (410).

Another input component in this example is historical context (410), which includes past or historical context relating to attitudes, events, and/or interactions associated with a reviewee (e.g., automotive dealership (420) or medical provider (426)). In some embodiments, historical context (410) focuses on recent or semi-recent data or information (e.g., within some window of time, or with more recent information weighted more heavily) as opposed to older information. Some examples of historical context (410) that may be captured and/or assessed include:

- What previous responses to previous feedback (or, more generally, sentiment content) have worked?
- Identifying any patterns in historic reviews or sentiment content. For example, if the reviewee is a breakfast/brunch restaurant, a problem with specific products (e.g., waffles, bacon, etc.) can be identified by accessing the historic reviews of a place so we can mine patterns in the reviews.

Environmental context (418) in this example is used to provide context or other information associated with the environment in which a service was provided and/or a product was produced and/or delivered. In some cases, environmental context (418) is used to give context about exogenous forces or events beyond the control of the reviewee which may have resulted in a negative review or experience. Some examples of environmental context (418) include and/or are related to:

- Bad traffic and/or an accident;
- Bad weather;
- Crowds due to an event nearby (e.g., a baseball game or a concert); and/or
- Power outages.

In some embodiments, environmental context (418) relates to the reviewer. For example, for a social media review, it is desirable and/or typical to respond within a few minutes of a post (e.g., 5 minutes). A review on a different platform or channel (e.g., Google) may have a longer acceptable response time (e.g., 20 minutes). In some embodiments, environmental context (418) includes context about the source and/or channel of the sentiment content and/or an acceptable or expected response time.

In this example, temperature adjustment (419) is used to specify (e.g., to a GenAI tool) a degree or amount of randomness and/or variability in the GenAI-generated response content. For example, a higher temperature value (i.e., hotter), in the dynamic context, corresponds to a greater degree of randomness and/or variability, which may be riskier because the response content may be more likely to be "out of bounds" or otherwise undesirable from some safe and/or approved response content (e.g., a greater degree of variance from an approved template). In contrast, a lower temperature value (in the dynamic context) produces more tightly constrained (i.e., less randomness, less variability, etc.) GenAI-generated response content.

In this example, language complexity (421) includes or more parameters or settings that is/are used to specify (e.g., to the GenAI tool) a desired degree or amount of language complexity in the resulting GenAI output. For example, setting language complexity to a higher value may correspond to less slang and/or more proper syntax, punctuation, and/or grammar in the resulting GenAI output. In some embodiments, language complexity (421) includes multiple fields and/or properties which can be set or otherwise specified independently from other fields.

In this example, the sentiment processor (423) analyzes sentiment content (e.g., raw/original or filtered/post-processed to some degree) and outputs a degree or amount (i.e., values) for each sentiment. In one simple example, a sentiment processor outputs a value within the range of [−1, 1] where a positive value corresponds to a positive sentiment (or opinion, feeling, emotion, etc.) and a negative value corresponds to a negative sentiment. The magnitude indicates a degree or strength of the sentiments (e.g., 0.3=slightly positive; 1.0=extremely or maximally positive).

As shown in this example, in some embodiments, generating dynamic context (e.g., at step 302 in FIG. 3) includes selecting one or more input components from a library of input components that includes one or more of the following: location-based information, industry-based information, brand guidelines, historical context, environmental context, temperature adjustment, language complexity, or a sentiment processor.

As shown in this example, in some embodiments, generating dynamic context (e.g., at step 302 in FIG. 3) includes selecting one or more input components from a library of input components that includes one or more of the following: location-based information, industry-based information, brand guidelines, historical context, environmental context, temperature adjustment, language complexity, or a sentiment processor; and for at least one of the selected input components, generating a corresponding value.

In some embodiments, selected input components (e.g., selected from the library of input components (403)) are used to populate an objective function which in turn is part of dynamic context that is passed to a GenAI tool. The following figure shows an example of this.

Figure 5:
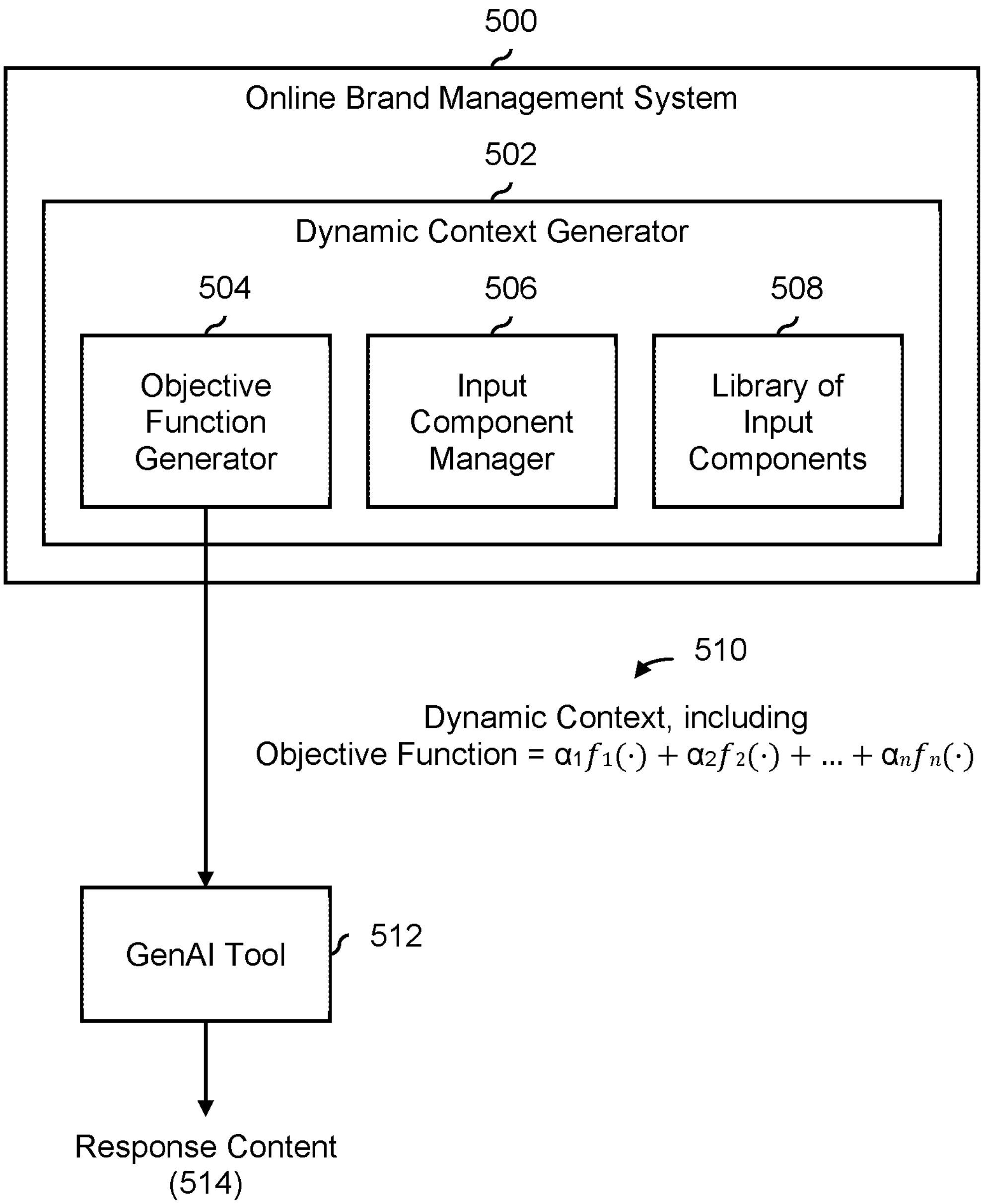
FIG. 5 is a diagram illustrating an embodiment of an online brand management system that generates dynamic context which includes an objective function.

FIG. 5 is a diagram illustrating an embodiment of an online brand management system that generates dynamic context which includes an objective function. In some embodiments, dynamic context is generated (e.g., at 302 in FIG. 3) using the example techniques shown here.

In this example, the online brand management system (500) includes a dynamic context generator (502) which in turn includes an objective function generator (504), an input component manager (506), and a library of input components (508). For brevity, detailed descriptions of the input component manager (506) and library of input components (508) are not repeated herein. In this example, the objective function generator (504) generates an objective function (e.g., 510) by communicating with and/or by commanding the input component manager (506) to select input components from the library (508). In this example, the objective function generator (504) also instructs the input component manager (506) to generate one or more coefficients (e.g., $\alpha_1, \ldots, \alpha_n$) for at least some of the input components that are selected from the library. The objective function generator (504) then takes the input components that are selected by the input component manager (506) and the coefficients generated by the input component manager (506) and assembles the exemplary objective function (i.e., $\alpha_1 f_1(\bullet)+\ldots+\alpha_n f_n(\bullet)$) which is included in or otherwise part of the dynamic context (510).

This dynamic context (510) includes the objective function passed from the objective function generator (504) to the GenAI tool (512). The GenAI tool (512) then generates and outputs response content (514) which optimizes the objective function. For example, conceptually, there are multiple possible or potential instances of response content, each of which when applied to the objective function produces a different value; the response content that optimizes the objective function (e.g., maximizes or minimizes the produced value from the objective function) is output by the GenAI tool (512) as the (e.g., final or returned) response content (514).

In this example, the functions in the objective function (i.e., $f_1(\bullet), f_2(\bullet), \ldots, f_n(\bullet)$) correspond to and/or are populated using the selected input functions (e.g., selected from the library (508) by the input component manager (506)). Similarly, the coefficients in the objective function (i.e., $\alpha_1, \alpha_2, \ldots, \alpha_n$) are constants and/or values that are determined by the input component manager (506).

As is shown in this example, in some embodiments, generating the dynamic context (e.g., at 302 in FIG. 3) includes selecting one or more input components from a library of input components (e.g., input component manager (506) selects from library (508) in response to instructions from and/or under guidance by objective function generator (504)); for at least one of the selected input components, a corresponding value is generated, where the dynamic context includes an objective function (e.g., 510) which in turn includes a coefficient (e.g., $\alpha_1, \ldots, \alpha_n$) and a function (e.g., $f_1(\bullet), \ldots, f_n(\bullet)$), the coefficient of the objective function includes the corresponding value that is generated for said at least one of the selected input components, and the function of the objective function includes said at least one of the selected input components.

Taking a step back, one problem with existing GenAI techniques that have human review of suggested, GenAI-produced content is that the usage and/or publication of such content is highly subjective and dependent upon the (human) reviewer. The following figure shows an example where an objective function (e.g., in dynamic context) is tailored to and/or based on a particular user or reviewer of an online brand management system.

Figure 6:
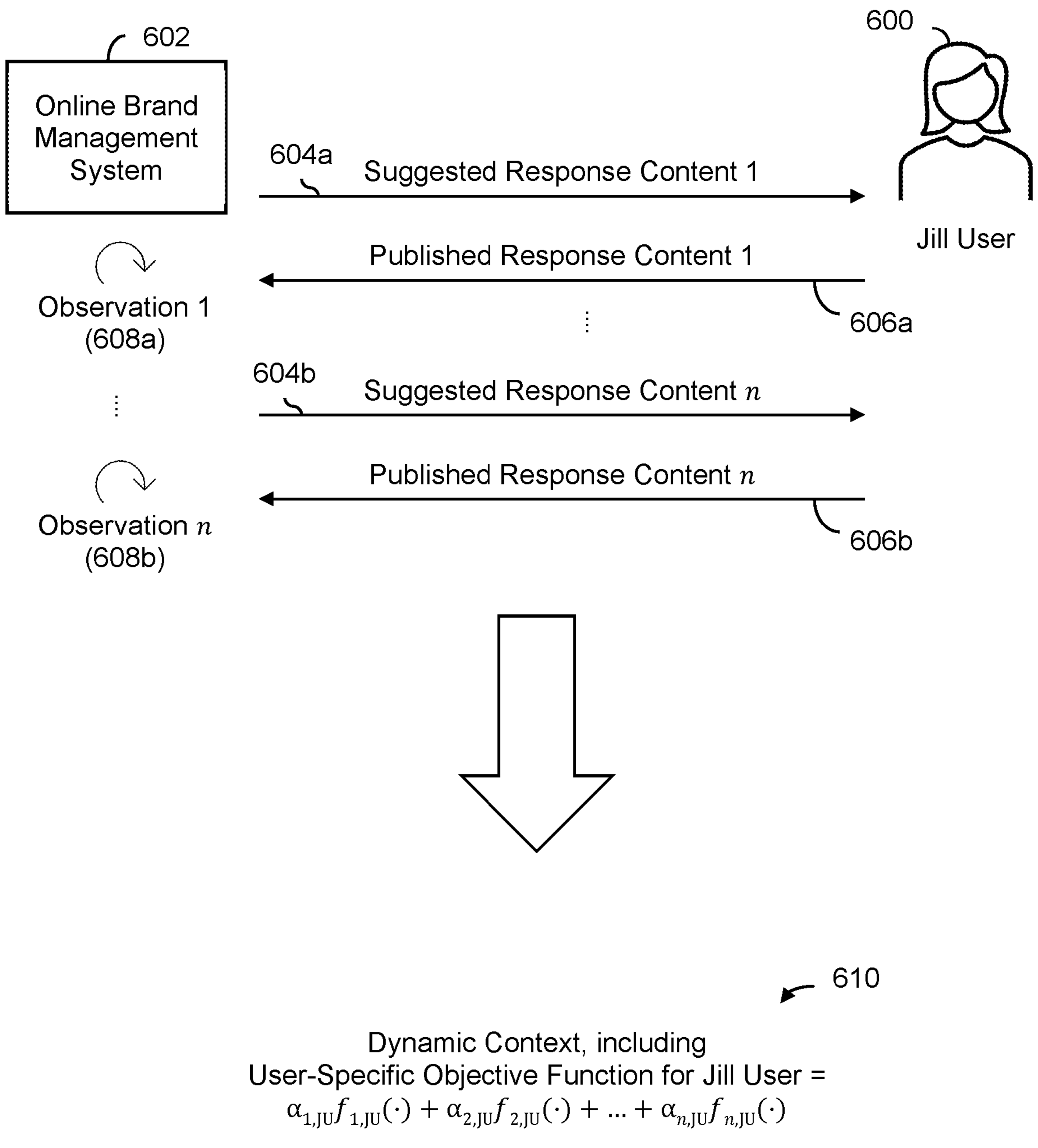
FIG. 6 is a diagram illustrating an embodiment of interactions with an online brand management system that are used to generate an objective function which targets to a specific user of the online brand management system.

FIG. 6 is a diagram illustrating an embodiment of interactions with an online brand management system that are used to generate an objective function which targets to a specific user of the online brand management system. In this example, an online brand management system (602) generates multiple instances of suggested response content (604*a*-604*b*) using initial and/or default dynamic context (not shown) and sentiment content (not shown). In some embodiments, techniques described above (e.g., associated with selecting input components from a library, generating an objective function, etc.) are combined with the techniques described in this figure; for brevity, some of those previously-described techniques are not repeated herein.

The first instance of suggested response content (604*a*) is sent (or otherwise accessed, reviewed, etc.) from the online brand management system (602) to Jill User (600). Jill User (600) reviews the suggested response content (604*a*) and edits, rejects, approves, and/or publishes the content using the online brand management system (602). For example, the suggested response content (604*a*) may be published or otherwise posted as-is, without any changes. Or, the suggested response content (604*a*) may be edited by Jill User (600) and then the edited response content (not shown) is published. In some cases, Jill User (600) may completely ignore the suggested response content (604*a*) and draft something from scratch. All of these possibilities are captured in or otherwise represented by the first instance of published response content (606*a*).

In the example shown here, this back-and-forth between the online brand management system (602) and Jill User (600) goes up to an $n^{th}$ suggested response content (604*b*) and an $n^{th}$ published response content (606*b*). From these interactions between the online brand management system (602) and Jill User (600), there are n observations (608*a*-608*b*). These n observations (608*a*-608*b*) are used to generate dynamic context (610) which includes a user-specific and/or user-tailored objective function for Jill User (600): $\alpha_{1,JU} f_{1,JU}(\bullet)+\alpha_{2,JU} f_{2,JU}(\bullet)+\ldots+\alpha_{n,JU} f_{n,JU}(\bullet)$.

The dynamic context (610) which includes a user-specific objective function is then used (e.g., in place of a generic and/or non-user-specific objective function or dynamic context) by the online brand management system (602) to generate new and/or subsequent suggested response content for Jill User (600). These new instances of suggested response content (e.g., an $(n+1)^{th}$ instance of suggested response content, an $(n+2)^{th}$ instance of suggested response content, etc.) are better matched to Jill User's preferences and/or taste due to the user-specific objection function that is specifically tailored to Jill User (600).

Conceptually, a user-specific objective function is an objective function that is reflective of a particular user's preferences, past observations of that user's actions, etc. An instance of response content that optimizes (e.g., maximizes) the user-specific objective function for Jill User is more likely to be published as-is by Jill User (600) without edits. In contrast, an instance of response content that produces a less optimal value (e.g., a lower, non-maximal value when evaluating the user-specific objective function for Jill User) is more likely to be (e.g., partially) edited, or rejected outright.

One benefit that the exemplary applications and/or systems described herein have over other applications and/or systems is that it is a closed-loop or closed-environment system where the online brand management system (602) is able to observe all published or posted response content. This, in turn, enables the exemplary online brand management system (602) to be able to generate a good-quality, user-specific objective function which in turn produces a higher quality of suggested response content that Jill User (600) is more likely to accept and/or edit more lightly. Jill User (600) is not, for example, permitted or otherwise able to post response content outside of the scope of the online brand management system (602). In contrast, other systems operate in an open environment where the system cannot see all of the suggested, GenAI-generated content as well as the accepted or published content. In such applications, it is difficult or impossible to generate a user-specific objective function of sufficient quality which enables the system to generate suggested response content that better appeals to and/or better matches a user's preferences and/or taste. An important performance metric for the online brand management system (602) or competing systems is the utilization or acceptance rate (e.g., to what degree does the user accept or use the suggested response content?) and improving this performance metric in turn improves the performance of the system.

As shown in this example, in some embodiments, generating the dynamic context (e.g., at 302 in FIG. 3) includes: obtaining a plurality of observations (e.g., 608*a*-608*b*) associated with a user (e.g., 600) of an online brand management system (e.g., 602); and generating a user-specific objective function based at least in part on the plurality of observations associated with the user, wherein the dynamic context includes the user-specific objective function (e.g., 610).

In this example, the objective function targets the preferences and/or taste of a specific user. In some cases, this is acceptable, for example, if the user is an ultimate decision maker (e.g., an owner or manager of a business) or otherwise has the authority about how best to respond to sentiment content (e.g., social media director). In some cases, however, a user-specific objective function may not be appropriate or desirable. For example, if there is a team of users that review, edit (if needed), and approve suggested response content, it may be undesirable to use a user-specific objective function for lower-level users because they may be a new or rogue user that publishes undesirable response content. The following figures illustrate an example of an online brand management system that has audit and/or review capabilities to assess or otherwise evaluate lower-level and/or supervised users who are tasked with reviewing and approving GenAI-generated suggested response content.

Figure 7A:
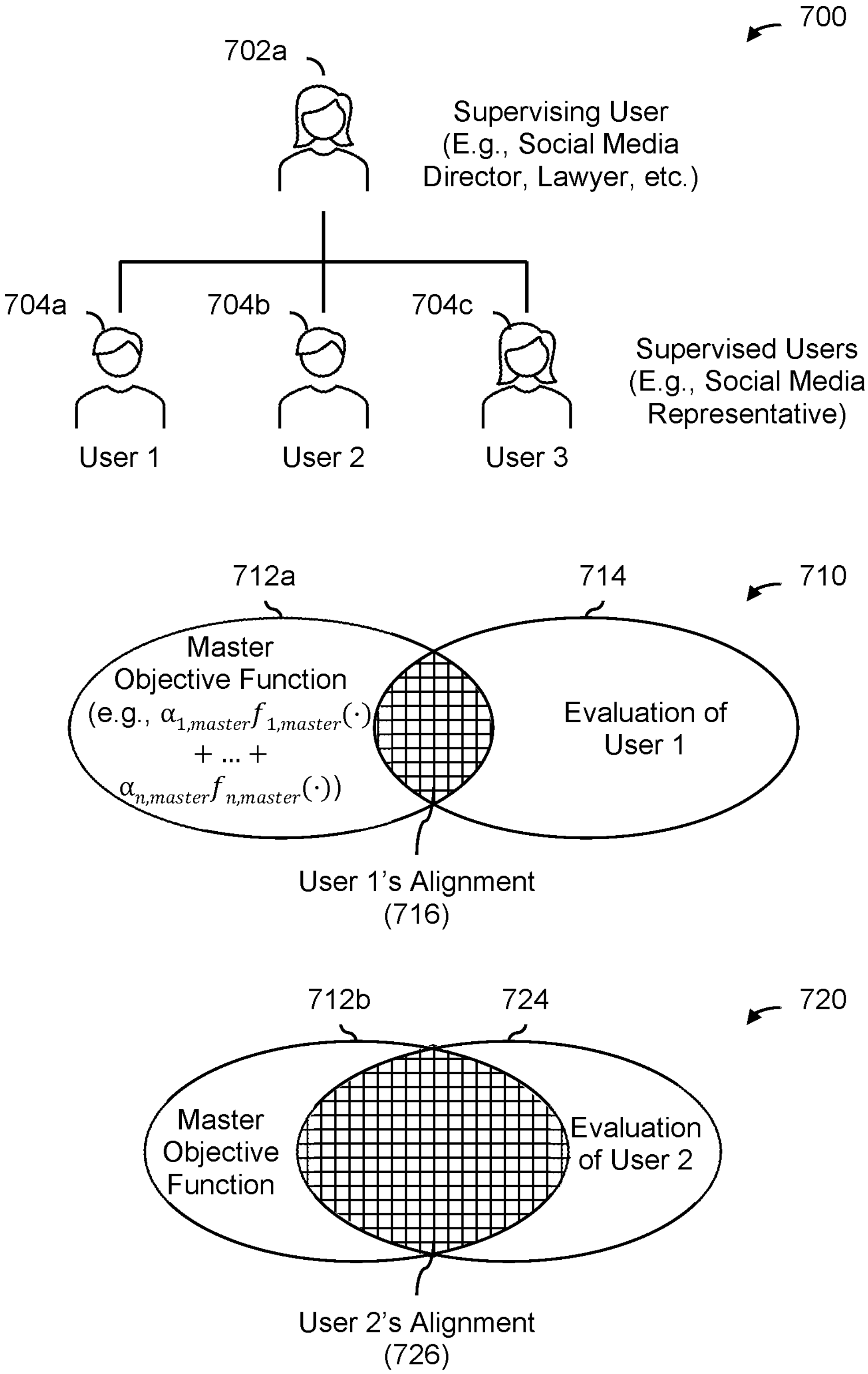
FIG. 7A is a diagram illustrating an embodiment of supervised users of an online brand management system who are evaluated using tools or services provided by the online brand management system.

FIG. 7A is a diagram illustrating an embodiment of supervised users of an online brand management system who are evaluated using tools or services provided by the online brand management system. In this example, diagram 700 shows an organizational chart where a supervising user (702*a*) manages or otherwise supervises three supervised users (704*a*-704*c*). For example, the former (702*a*) may be a social media director or lawyer who sets the standard for desired, low-risk, and/or regulatory-compliant response content and the latter (704*a*-704*c*) may be social media representatives who are lower level and/or without the authority to set such a standard.

In this example, the supervised users (704*a*-704*c*) are responsible for reviewing GenAI-generated suggested response content (e.g., generated using the techniques described herein), editing the suggested response content (e.g., as or if needed, according to their judgement with the company's standards or preferences in mind), and publishing or otherwise posting a final or approved version of the response content.

Diagram 710 shows an example evaluation of the first supervised user (704*a*), performed by the supervising user (702*a*) using an online brand management system. In diagram 710, the oval on the left (712*a*) represents a (e.g., conceptual) example of a master objective function (e.g., $\alpha_{1,master}f_{1,master}(\bullet)+ \ldots +\alpha_{n,master}f_{n,master}(\bullet)$). Conceptually, a master objective function (e.g., 712*a* and 712*b*) attempts to steer the GenAI tool towards better-quality GenAI outputs that are closest to the company's desired and/or preferred (e.g., inoffensive, regulatory-compliant, etc.) scope or outcome. To put it another way, GenAI-generated suggested response content that optimizes (e.g., maximizes) the value of the master objective function corresponds to response content that ideally and/or optimally matches the company's desired standards, preferences, objectives, etc. In some embodiments, a master objective function (e.g., 712*a* and 712*b*) is obtained using a training set or collection of approved and/or exemplary response content (e.g., where the training set is curated or otherwise selected by the supervising user (702*a*)).

The oval on the right (714) represents the evaluation of the first supervised user (i.e., User 1). In some embodiments, an evaluation (e.g., 714) is a single value that is produced (e.g., by the online brand management system) by obtaining historic published response content and/or historic interactions (e.g., a combination of suggested response content and the corresponding published response content) and applying the obtained historic information to the master objective function in order to obtain a single value. In some other embodiments, the evaluation (714) is multi-dimensional, such as a collection or array of values. For example, each term in a master objective function (e.g., $\alpha_{1,master}f_{1,master}(\bullet)$ or $\alpha_{2,master}f_{2,master}(\bullet)$ and so on) may be evaluated to produce n values.

The overlap or intersection between the master objective function (712*a*) and the first user's evaluation (714) is the alignment (e.g., a degree of similarity or concentricity) for a first supervised user, User 1 (704*a*). The size and/or area of an alignment (e.g., 716 or 726) indicates or otherwise represents the degree to which a particular user matches a company's objectives and/or standards (e.g., expressed by the master objective function (712*a* or 712*b*) or some other description). In this example, User 1 (704*a*) is more of a rogue user and is less compliant, as indicated by the relatively small amount of overlap in User 1's alignment (716).

In contrast, the bottom diagram (720) shows a more compliant supervised user. In that example, the (same) master objective function (712*b*) is shown, but this time with the evaluation (724) of the second supervised user, User 2 (704*b*). User 2's alignment (726), which is the intersection of the (same) master objective function (712*b*) and User 2's evaluation (724), is larger than User 1's alignment (716), indicating that User 2's edits to and/or acceptance of GenAI-generated suggested response content is more aligned with the master objective function (712*b*) compared to User 1 (704*a*).

The following figure continues this example and shows an example of components in an online brand management system that support the evaluation tools described above.

Figure 7B:
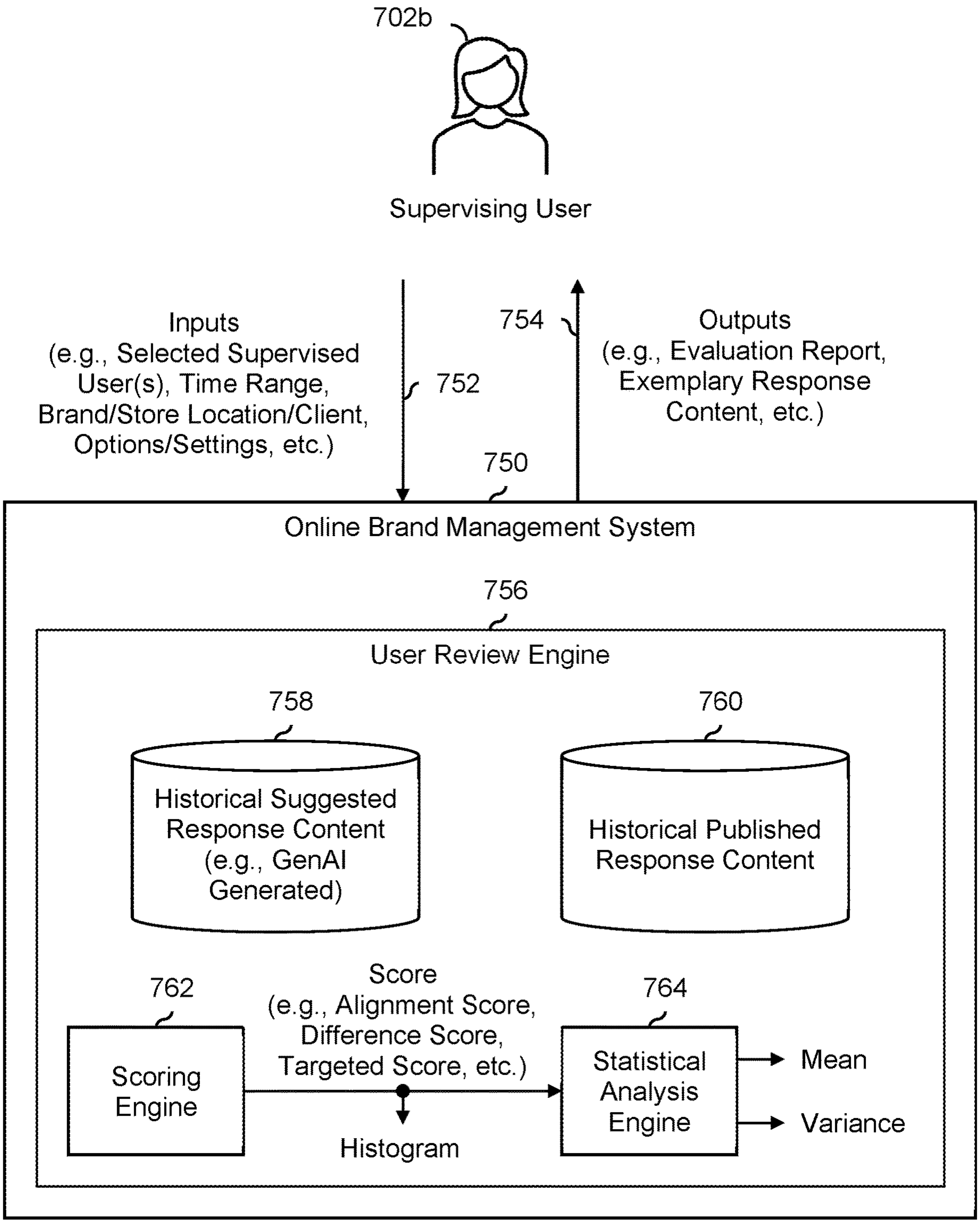
FIG. 7B is a diagram illustrating an embodiment of a supervising user interacting with an online brand management system to evaluate a supervised user.

FIG. 7B is a diagram illustrating an embodiment of a supervising user interacting with an online brand management system to evaluate a supervised user. FIG. 7B continues the example of FIG. 7A. In this example, a supervising user (702*b*) interacts with an online brand management system (750) to evaluate one or more selected supervised user(s). To support these management, analysis, and/or evaluation tools or operations, the online brand management system (750) includes a user review engine (756) which in turn includes historical suggested response content (758) (e.g., generated by GenAI using techniques described herein), historical published response content (760) (e.g., what was actually published or posted by the user, for example, after editing the corresponding item of historical suggested response content), a scoring engine (762), and a statistical analysis engine (764).

In this application (i.e., brand management on online channels), all users have to publish or otherwise post response content using the online brand management system (750). As a result, the online brand management system (750) is omniscient and is able to obtain or otherwise record all historical information (758 and 760) for each supervised user. In other applications and/or systems, that is not the case (i.e., those other systems do not have all historical information) and those other systems cannot provide evaluation tools, or evaluation tools are available but they are of lower quality due to not knowing or having all of the historical information.

Some examples of inputs (752) from the supervising user (702*b*) to the online brand management system (750) include one or more selected supervised users to evaluate, or a time range over which to perform an evaluation. In some applications where a supervised user is responsible for responding to sentiment content for multiple and/or different brands, store locations, clients, etc., the inputs (752) may include an identification of the brand, store location, client, etc. for which to perform an evaluation.

Other example inputs (752) include evaluation options or settings, such as a type of evaluation report to generate, what contents to include in an evaluation report (e.g., what type of score to generate), whether to use a master objective function or some other description of a desired standard or objectives that a supervised user is supposed to achieve, or an option or setting associated with the scoring engine (762) or the statistical analysis engine (764).

An example of an output (754) from the online brand management system (750) to the supervising user (702*b*) is an evaluation report (e.g., of a selected supervised user, over a specified time range, and/or with the selected evaluation report types or contents). As described above, the scope and/or contents of the evaluation report (754) may be specified by the supervising user (702) using corresponding options or settings in the inputs (752).

In this example, the scoring engine (762) is responsible for generating one or more scores (e.g., a value for some evaluation metric, a value for a (e.g., brand) characteristic, a value for an input component, etc.) for each selected supervised user.

In some embodiments, a score is an alignment score (e.g., a measure of how well the selected supervised user is in alignment with the brand or company's objectives, goals, and/or standard). For example, an alignment score may be generated using a master objective function (e.g., 712*a*/712*b* in FIG. 7A).

Alternatively, in some other embodiments, a score is an unaligned score (e.g., that does not measure alignment with some desired and/or master goal or objective). For example, to use the brand characteristic examples described above (e.g., associated with brand guidelines (408) in FIG. 4), a scoring engine (762) may generate unaligned scores for the brand characteristics of professional, friendly, playful, inspirational, and innovative for some input content (e.g., without knowledge of a brand, company, or client's goals or objectives). Or, an unaligned score generated by the scoring engine (762) may be a measurement of, or related to, semantics or language complexity. This mode (i.e., of generating unaligned scores) may be useful in situations where a desired set of goals and/or a master objective function does not exist. For example, a social media team may be small or newly formed, and a master objective function or similar may not yet have been created for the group. This mode permits a supervising user to gain insight into her team's work, even in situations where no master objective function or similar have been specified.

In some embodiments, a score is a difference score (e.g., a delta or "distance traveled") between a piece of historical suggested response content and the corresponding piece of historical published response content. In some embodiments, a difference score (like some other scores) is a value that is generated according to, or as measured by, some evaluation metric, (e.g., brand) characteristic, input component, etc.

In some embodiments, a score is a targeted score (e.g., a targeted alignment score, a targeted difference score, etc.), for example, targeted to a specific brand, store location, or client. For example, a supervised user may be responsible for publishing or otherwise posting response content for multiple brands, store locations, and/or clients. In some cases, a supervised user may respond in a manner that is more aligned for one brand (as an example) compared to another brand. For example, suppose that one brand is more casual and playful. A supervised user who is younger with a natural tendency towards more casual language may tend to produce response content for that brand that is better aligned with that brand's goals or objectives. In contrast, that same supervised user may struggle to produce response content for a more formal, serious brand. Similarly, there may be differences in regional slang for one store location (e.g., Atlanta) versus another store location (e.g., Los Angeles), that show up in different targeted scores for different store locations for a given or same supervised user. The ability to specify or otherwise target a particular brand, store location, and/or client permits the supervising user (702*b*) to do a more nuanced assessment of a supervised user.

The statistical analysis engine (764) inputs scores (or, more generally, values) from the scoring engine (762) and performs various statistical operations and/or analysis on those scores. In this particular example, a mean and variance are generated (e.g., for a given set of related scores).

In this example, a histogram (or other distribution function) is generated from the scores that are output by the scoring engine (762). In some embodiments, the histogram(s) is/are included in an evaluation report or other output (754) which is presented to the supervising user (702*b*).

In some embodiments, an evaluation report (or other output) which is presented to the supervising user (702*b*) includes a mean, a variance, or other statistical value or analysis result that is generated by the statistical analysis engine (764). In one example, an evaluation report includes a first, suggested histogram (e.g., generated from historical suggested response content (758)) and a related first (e.g., historical) mean and first (e.g., historical) variance. The exemplary evaluation report in the output (754) also includes a second, published histogram (e.g., generated from historical published response content (760)) and a related second (e.g., published) mean and second (e.g., published) variance.

In some embodiments, the outputs (754) from the online brand management system (750) to the supervising user (702*b*) include exemplary and/or selected response content (e.g., from historical suggested response content (758) or from historical published response content (760)). In some embodiments, the supervising user (702*b*) is initially presented with an evaluation report that includes selectable objects within the evaluation report (e.g., a histogram with stacked blocks, where each block corresponds to a particular piece of suggested or published response content). The supervising user (702*b*) selects one or more of those selectable objects and instructs the user interface to display the corresponding response content. This enables the supervising user (702*b*) to see exactly what was suggested and/or what was published for a particular data point or value.

As described above, in some embodiments, a selection of a selected supervised user (e.g., one or more of 704*a*-704*c* in FIG. 7A) is received (see, e.g., inputs (752) in FIG. 7B) and an evaluation report is displayed (see, e.g., outputs (754) in FIG. 7B) for the selected supervised user; historical published response content (e.g., 760 in FIG. 7B) for the selected supervised user is obtained and a score for the selected supervised user is generated using the historical published response content for the selected supervised user (see, e.g., score generated by scoring engine (762) in FIG. 7B); the evaluation report is generated, where the evaluation report includes information associated with the score for the selected supervised user (e.g., the score itself, or some statistical value generated from the score, such as mean or variance generated by statistical analysis engine (764)).

As described above, in some embodiments, a selection of a selected supervised user is received and an evaluation report for the selected supervised user is displayed. Historical published response content for the selected supervised user is obtained, and a score for the selected supervised user is generated using the historical published response content for the selected supervised user. The evaluation report is generated, where the evaluation report includes information associated with the score for the selected supervised user. Generating the score for the selected supervised user includes generating an alignment score for the selected supervised user using: (1) the historical published response content for the selected supervised user and (2) a master objective function. The evaluation report includes the alignment score.

As described above, in some embodiments, a selection of a selected supervised user is received and an evaluation report for the selected supervised user is displayed. Historical published response content for the selected supervised user is obtained, and a score for the selected supervised user is generated using the historical published response content for the selected supervised user. The evaluation report is generated, where the evaluation report includes information associated with the score for the selected supervised user. Historical suggested response content for the selected supervised user is obtained. Generating the score for the selected supervised user includes generating a difference score for the selected supervised user using: (1) the historical published response content for the selected supervised user and (2) the historical suggested response content for the selected supervised user. The evaluation report includes the difference score.

As described above, in some embodiments, a selection of a selected supervised user is received and an evaluation report for the selected supervised user is displayed. Historical published response content for the selected supervised user is obtained, and a score for the selected supervised user is generated using the historical published response content for the selected supervised user. The evaluation report is generated, where the evaluation report includes information associated with the score for the selected supervised user. A second selection is received that includes one or more of the following: a selected brand, a selected store location, or a selected client. The historical published response content is filtered using the second selection to obtain targeted historical published response content for the selected supervised user. Generating the score for the selected supervised user includes generating a targeted score for the selected supervised user using the targeted historical published response content for the selected supervised user; the evaluation report includes the targeted score.

As described above, in some embodiments, a selection of a selected supervised user is received and an evaluation report for the selected supervised user is displayed. Historical published response content for the selected supervised user is obtained, and a score for the selected supervised user is generated using the historical published response content for the selected supervised user. The evaluation report is generated, where the evaluation report includes information associated with the score for the selected supervised user. A user interface interaction associated with displaying response content is received. In response to receiving the user interface interaction, at least one response from the historical published response content is displayed.

Returning briefly to the exemplary organizational chart shown in diagram 700 in FIG. 7A, in some embodiments, the supervising user (702*a*) approves of or otherwise designates (e.g., permitted, authorized, and/or approved) templates which the supervised users (704*a*-704*c*) use to generate variations. The following figures show some examples of user interfaces associated with using or managing templates.

Figure 8A:
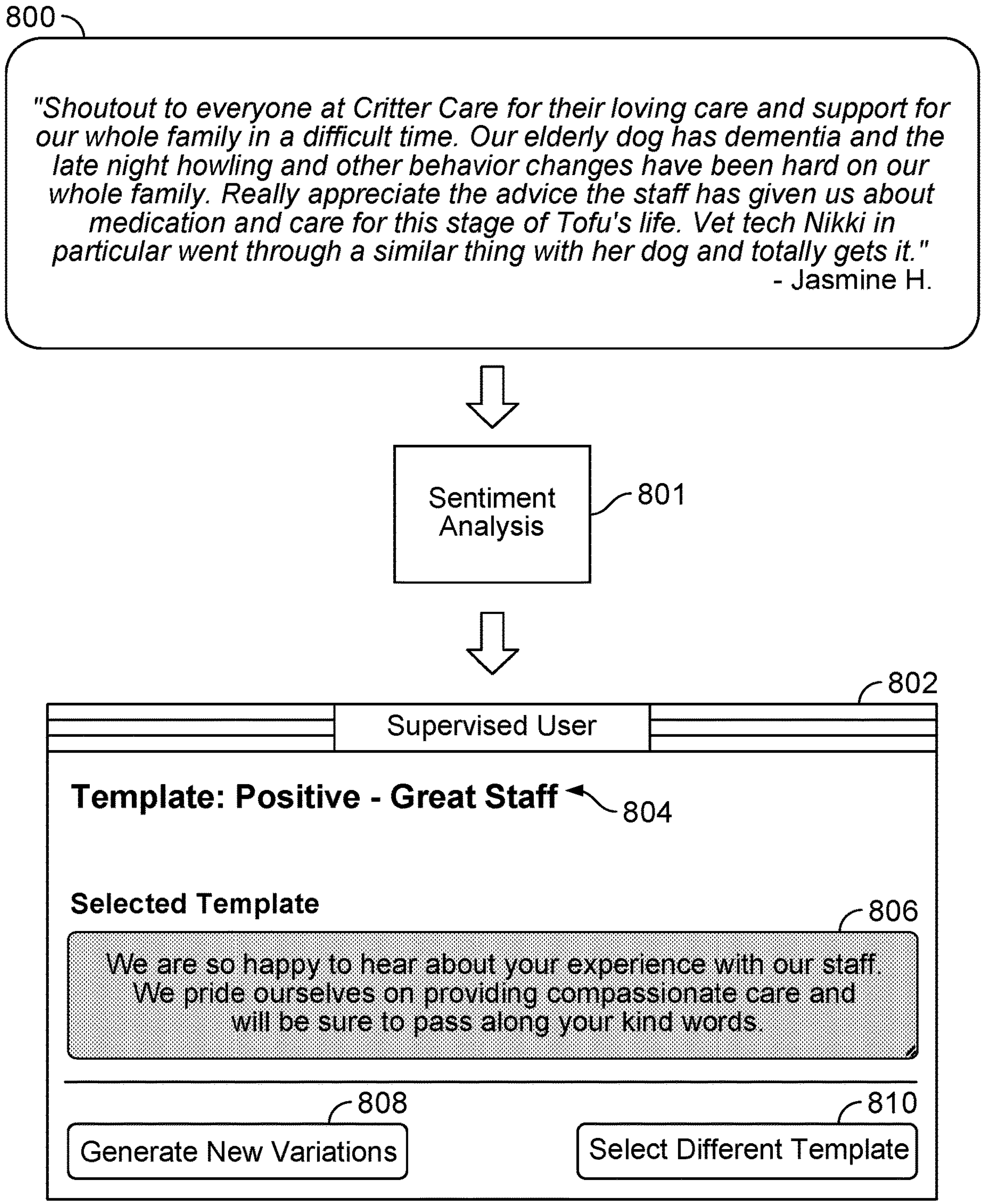
FIG. 8A is a diagram illustrating an embodiment of a user interface, for a supervised user, showing a template selection window associated with positive sentiment regarding staff.

FIG. 8A is a diagram illustrating an embodiment of a user interface, for a supervised user, showing a template selection window associated with positive sentiment regarding staff. In this example, a supervised user is in the process of publishing response content that is responsive to sentiment content (800) by Jasmine H. that says, "Shoutout to everyone at Critter Care for their loving care and support for our whole family in a difficult time. Our elderly dog has dementia and the late night howling and other behavior changes have been hard on our whole family. Really appreciate the advice the staff has given us about medication and care for this stage of Tofu's life. Vet tech Nikki in particular went through a similar thing with her dog and totally gets it."

In this example, an online brand management system (not shown) performs sentiment analysis (801) on the sentiment content (800) and determines that the sentiment content (800) has a positive sentiment about the staff. Based on the output of the sentiment analysis (801), the online brand management system selects one or more (e.g., permitted, authorized, and/or approved) templates that correspond to or are otherwise appropriate for the determined sentiments. In this example, since there are positive sentiments, positive templates (i.e., associated with positive sentiments) are selected. The online brand management system will not (for example) select or otherwise permit a (e.g., supervised) user of the online brand management system to use a negative template (i.e., associated with negative sentiments) since the sentiment content (800) has been determined to have a positive sentiment.

For simplicity and ease of explanation, the sentiment analysis (801) in this example is performed on (e.g., raw) sentiment content (800). In some embodiments, raw sentiment content is filtered or otherwise processed and sentiment analysis is performed on the resulting post-processed sentiment content.

In this example, the exemplary template selection window (802) is part of a user interface that is associated with and/or provided by an online brand management system. In the state shown here, the template selection window (802) has a header (804) that says "Template: Positive—Great Staff." This is in response to the results from the sentiment analysis (801) performed on the sentiment content (800). The selected template (806) says, "We are so happy to hear about your experience with our staff. We pride ourselves on providing compassionate care and will be sure to pass along your kind words."

In the state shown here, the user interface (802) has two buttons: generate new variations (808) and select different template (810). For example, the latter button (810) may bring up or otherwise display other positive templates (if any) that fit the selection criteria and the determined sentiments output by the sentiment analysis (801). One such other template may be a positive, generic template (e.g., that is agnostic to and/or generic with respect to a specific thing that a reviewer is positive about) as opposed to the positive, great staff template.

The following figure shows a variations window in response to the supervised user pressing the generate new variations button (808).

Figure 8B:
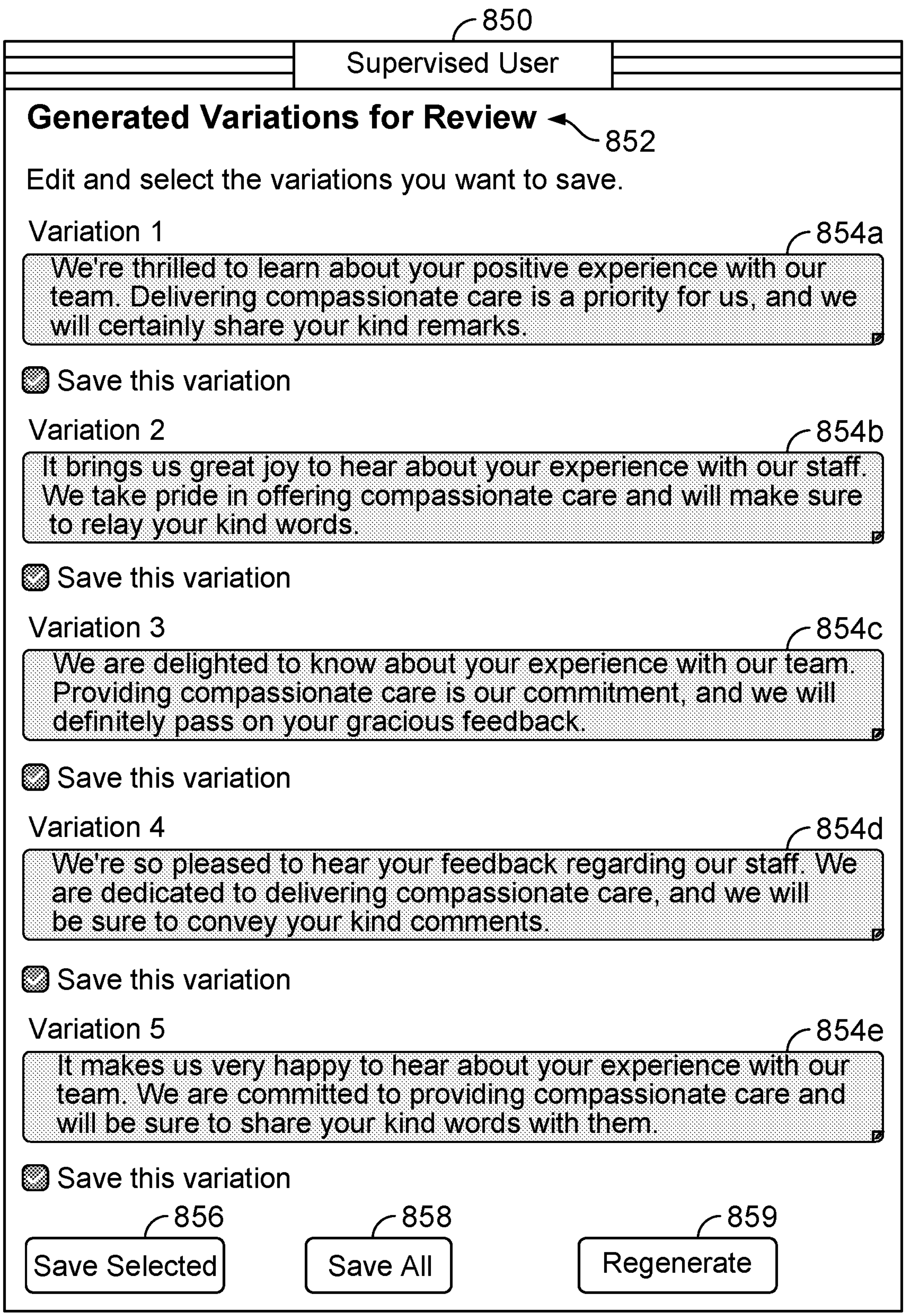
FIG. 8B is a diagram illustrating an embodiment of a user interface, for a supervised user, showing a variations window associated with positive sentiment regarding staff.

FIG. 8B is a diagram illustrating an embodiment of a user interface, for a supervised user, showing a variations window associated with positive sentiment regarding staff. In this example, the variations window (850) is part of the same user interface that includes the template selection window (802) from FIG. 8A. The variations window (850) includes a header (852) that says "Generated variations for review" and also includes the following five variations:

- Variation 1: "We're thrilled to learn about your positive experience with our team. Delivering compassionate care is a priority for us, and we will certainly share your kind remarks." (854*a*)
- Variation 2: "It brings us great joy to hear about your experience with our staff. We take pride in offering compassionate care and will make sure to relay your kind words." (854*b*)
- Variation 3: "We are delighted to know about your experience with our team. Providing compassionate care is our commitment, and we will definitely pass on your gracious feedback." (854*c*)
- Variation 4: "We're so pleased to hear about your feedback regarding our staff. We are dedicated to delivering compassionate care, and we will be sure to convey your kind comments." (854*d*)
- Variation 5: "It makes us very happy to hear about your experience with our team. We are committed to providing compassionate care and will be sure to share your kind words with them." (854*e*)

Returning briefly to the example of FIG. 1, the selected template (806) from FIG. 8A may be included in the dynamic context (110) that is sent from the online brand management system (103) to the GenAI tool (112). Correspondingly, the text of the variations (854*a*-854*e*) shown in FIG. 8B may be included in the suggested response content (118) sent from the GenAI tool (112) to the online brand management system (103).

Returning to FIG. 8B, the variations window (850) permits a supervised user to edit and select the variations the supervised user wants to save. For example, the text of the variations (854*a*-854*e*) can be edited within each text box and each variation has a corresponding save this variation checkbox.

At the bottom of the variations window (850) are three buttons: save selected (856), save all (858), and regenerate (859) (e.g., to generate a new set of variations).

In some embodiments, pushing the save selected button (856) or save all button (858) causes the selected variations (e.g., including any edits) to be aggregated into a single window or interface, for example, associated with editing a draft response. To put it another way, pushing save selected (856) or save all (858) will not cause a final version of response content to be published. It may be desirable to permit a supervised user to save multiple variations (e.g., to a draft or working space) because then the supervised user is able to use content from multiple and/or different variations. For example, by providing this capability, the user interface permits or otherwise enables the supervised user to be able to publish a response that includes the first sentence from the Variation 4 (854*d*) and the second sentence from the Variation 5 (854*e*) (e.g., by selecting and saving Variation 4 (854*d*) and Variation 5 (854*e*), and deleting the undesired sentences). In some embodiments, the selected and saved variations are populated or otherwise pushed into an interface associated with or otherwise provided by the channel of interest (e.g., a social media channel on which sentiment content (800) is posted and on which the corresponding response content will be posted).

Although this example permits a supervised user to edit the generated variations, in some other embodiments, a supervised user does not have this capability. For example, in some other scenarios, it may be important to maintain strict(er) control and/or tight(er) guardrails on the response content. To that end, in some embodiments, a user interface is configured so that a supervised user is permitted to select a different template (e.g., button (810) in FIG. 8A) or regenerate additional and/or new variations (e.g., button (859) in FIG. 8B), as or if desired, but not edit the generated variations.

Although this example shows human guidance and/or review by a supervised user (see, e.g., FIGS. 8A and 8B), in some embodiments, the example sequence described is fully automated. For example, in some embodiments, an online brand management system selects an appropriate template (e.g., based on sentiment analysis), generates at least one variation, and uses the generated variation in the published response content (e.g., without requiring human guidance and/or review).

Figure 8C:
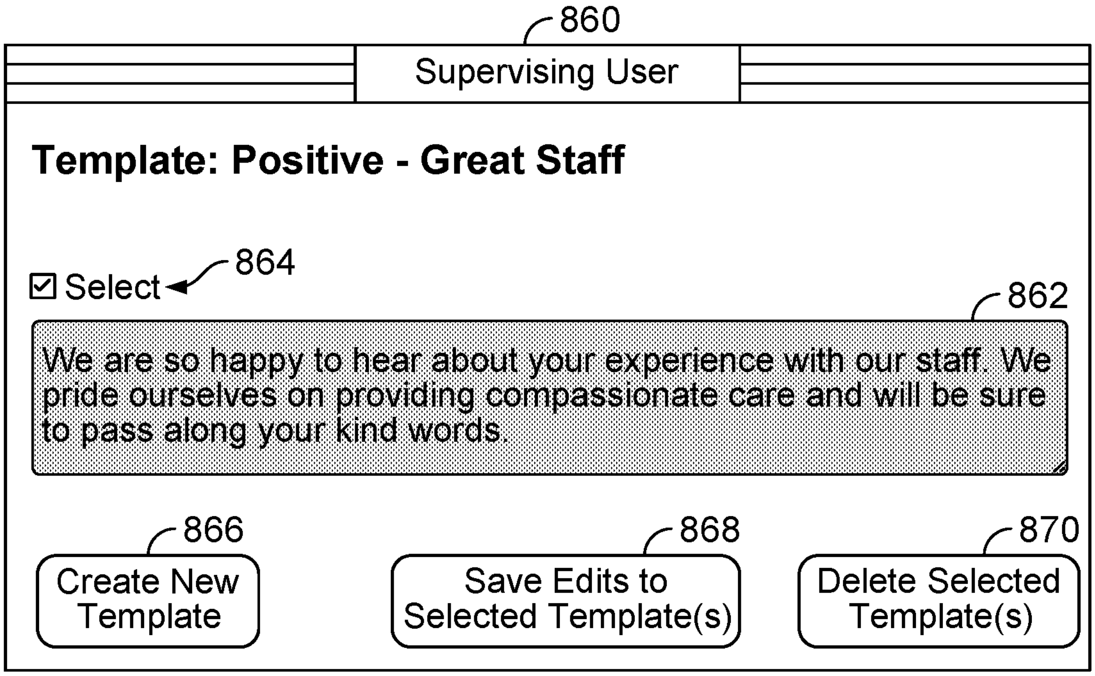
FIG. 8C is a diagram illustrating an embodiment of a user interface, for a supervising user, showing a template management window.

Using templates and generated variations (one example of which is shown in FIGS. 8A-8C) may be desirable because it addresses a specific problem in the realm of online brand management. Specifically, identical responses may trigger or otherwise be flagged on certain channels as being the work of bots, causing those response to be deleted, hidden, or in general triggering some undesired state. To avoid this, some variation and/or a "human touch" in response content is desirable, but (as described above) too much variation can lead to other problems such as violating a privacy law or regulation, etc. Using templates and variations (e.g., generated by GenAI from the templates) permits some degree of variation, but not too much variation, thus solving this problem in the realm of online brand management.

As described above, in some embodiments, dynamic context includes a template (e.g., 806 in FIG. 8A); generating the dynamic context includes performing sentiment analysis (e.g., 801 in FIG. 8A) on the sentiment content (e.g., 800) to obtain a determined sentiment; and automatically selecting the template based at least in part on the determined sentiment. A generative AI tool generates the response content, including by generating a variation of the template (see, e.g., the variations (854*a*-854*e*) in FIG. 8B), where the response content includes at least part of the variation.

The following figure shows an example of a user interface that a supervising user may use to manage templates.

FIG. 8C is a diagram illustrating an embodiment of a user interface, for a supervising user, showing a template management window. In this example, the template management window (860) is part of a user interface associated with or otherwise provided by an online brand management system, for a supervising user. In this example, there is a text window (862) showing the text of the positive, great staff template (806) from FIG. 8A. The text window (862) has a corresponding select checkbox (864). At the bottom of the template management window (860) are three buttons: create new template (866), save edits to selected template(s) (868), and delete selected template(s) (870).

Using this exemplary user interface, a supervising user can manage the (e.g., approved) templates, which in turn are passed on to and used by a supervised user, as described above.

Although not shown in this example, in some embodiments, a generated variation (e.g., 854*a*-854*e* in FIG. 8B) is able to become a template (e.g., using tools or capabilities provided by the user interface). For example, a supervised user may nominate (e.g., to a supervising user) a generated variation to become a template. In some embodiments, if the "distance" between a template and a generated variation is sufficiently small, that "short distance" variation is automatically permitted to become a template (e.g., without requiring approval), or saved for future use as response content (e.g., even if an originating template is deleted or edited). Or, if a supervising user themselves generates response content using templates and generated variations, the supervising user can select a generated variation (e.g., that they encountered while generating and publishing response content) to be saved as a template.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

an interface that:
- receives original sentiment content; and
- outputs dynamic context and anonymized sentiment content to a generative AI tool; and a processor that:
- anonymizes the original sentiment content to obtain the anonymized sentiment content;
- generates the dynamic context based at least in part on the anonymized sentiment content and location-based information, wherein:
  - generating the dynamic context includes:
    - selecting two or more input components from a library of input components that includes two or more of the following: the location-based information, industry-based information, brand guidelines, historical context, environmental context, temperature adjustment, language complexity, or a sentiment processor; and
    - for each of the selected two or more input components, generating a corresponding value;
  - the dynamic context includes an objective function which in turn includes a coefficient and a function;
  - the coefficient of the objective function includes the corresponding value that is generated for each of the selected two or more input components, wherein the coefficient is specific to the selected two or more input component; and
  - the function of the objective function includes each of the selected two or more input components; and
- generates response content, using the generative AI tool, based at least in part on the dynamic context and the anonymized sentiment content by optimizing the objective function.

2. The system recited in claim 1, wherein the original sentiment content is received via a third-party monitoring service that monitors a plurality of sources.

3. The system recited in claim 1, wherein:

the processor further generates post-processed sentiment content using the original sentiment content, including by performing one or more of the following: checking relevance based at least in part on ownership of a store location, deciding whether the dynamic context should be generated, applying a standardized format, removing identifying or sensitive information, or performing sentiment analysis; and the post-processed sentiment content is used to generate the dynamic context.

4. The system recited in claim 1, wherein the dynamic context includes a dynamic role directive associated with one or more of the following: a persona, job, or role.

5. The system recited in claim 1, wherein the dynamic context includes a template.

6. The system recited in claim 1, wherein:

the dynamic context includes a comparison area having a position and a size;

generating the dynamic context includes:
- setting the position of the comparison area using the location-based information; and
- setting the size of the comparison area using the industry-based information; and the generative AI tool generates the response content that provides context which is bounded by the position of the comparison area and the size of the comparison area.

7. The system recited in claim 1, wherein generating the dynamic context includes:

obtaining a plurality of observations associated with a user of an online brand management system; and generating a user-specific objective function based at least in part on the plurality of observations associated with the user, wherein the dynamic context includes the user-specific objective function.

8. The system recited in claim 1, wherein:

the interface further:
- receives a selection of a selected supervised user; and
- displays an evaluation report for the selected supervised user; and the processor further:
obtains historical published response content for the selected supervised user;
generates a score for the selected supervised user using the historical published response content for the selected supervised user; and
generates the evaluation report, wherein the evaluation report includes information associated with the score for the selected supervised user.

9. A system, comprising:
an interface that:
receives original sentiment content;
outputs dynamic context and anonymized sentiment content to a generative AI tool;
receives a selection of a selected supervised user; and
displays an evaluation report for the selected supervised user; and
a processor that:
anonymizes the original sentiment content to obtain the anonymized sentiment content;
generates the dynamic context based at least in part on the anonymized sentiment content and location-based information;
generates response content, using the generative AI tool, based at least in part on the dynamic context and the anonymized sentiment content;
receives approval, by the selected supervised user, of the generated response content;
publishes the generated response content on a social media platform after receiving the approval by the selected supervised user;
obtains historical published response content for the selected supervised user, wherein the historical published response content comprises the published generated response content and other approved published responses;
generates a score for the selected supervised user using the historical published response content for the selected supervised user;
generates the evaluation report, wherein:
the evaluation report includes information associated with the score for the selected supervised user;
generating the score for the selected supervised user includes generating an alignment score for the selected supervised user using: (1) the historical published response content for the selected supervised user and (2) a master objective function; and
the evaluation report includes the alignment score and one or more selectable objects; and
receives a selection, by a supervising user, of at least one of the one or more selectable objects to obtain historical published responses for the selected supervised user and control a user interface to display the obtained historical published responses.

10. A system, comprising:
an interface that:
receives original sentiment content;
outputs dynamic context and anonymized sentiment content to a generative AI tool;
receives a selection of a selected supervised user; and
displays an evaluation report for the selected supervised user; and
a processor that:
anonymizes the original sentiment content to obtain the anonymized sentiment content;
generates the dynamic context based at least in part on the anonymized sentiment content and location-based information;
generates response content, using the generative AI tool, based at least in part on the dynamic context and the anonymized sentiment content;
receives approval, by the selected supervised user, of the generated response content;
publishes the generated response content on a social media platform after receiving the approval by the selected supervised user;
obtains historical published response content for the selected supervised user, wherein the historical published response content comprises the published generated response content and other approved published responses;
generates a score for the selected supervised user using the historical published response content for the selected supervised user;
generates the evaluation report;
obtains historical suggested response content for the selected supervised user, wherein:
the evaluation report includes information associated with the score for the selected supervised user;
generating the score for the selected supervised user includes generating a difference score for the selected supervised user using: (1) the historical published response content for the selected supervised user and (2) the historical suggested response content for the selected supervised user; and
the evaluation report includes the difference score and one or more selectable objects; and
receives a selection, by a supervising user, of at least one of the one or more selectable objects to obtain historical published responses for the selected supervised user and control a user interface to display the obtained historical published responses.

11. A system, comprising:
an interface that:
receives original sentiment content;
outputs dynamic context and anonymized sentiment content to a generative AI tool;
receives a selection of a selected supervised user;
displays an evaluation report for the selected supervised user; and
receives a second selection that includes one or more of the following: a selected brand, a selected store location, or a selected client; and
a processor that:
anonymizes the original sentiment content to obtain the anonymized sentiment content;
generates the dynamic context based at least in part on the anonymized sentiment content and location-based information;
generates response content, using the generative AI tool, based at least in part on the dynamic context and the anonymized sentiment content:
receives approval, by the selected supervised user, of the generated response content;
publishes the generated response content on a social media platform after receiving the approval by the selected supervised user;
obtains historical published response content for the selected supervised user, wherein the historical published response content comprises the published generated response content and other approved published responses;

generates a score for the selected supervised user using the historical published response content for the selected supervised user;

generates the evaluation report, wherein the evaluation report includes information associated with the score for the selected supervised user;

filters the historical published response content using the second selection to obtain targeted historical published response content for the selected supervised user, wherein:

generating the score for the selected supervised user includes generating a targeted score for the selected supervised user using the targeted historical published response content for the selected supervised user; and the evaluation report includes the targeted score and one or more selectable objects; and receives a selection, by a supervising user, of at least one of the one or more selectable objects to obtain historical published responses for the selected supervised user and control a user interface to display the obtained historical published responses.

12. The system recited in claim 8, wherein the interface further:

receives a user interface interaction associated with displaying the response content; and in response to receiving the user interface interaction, displays at least one response from the historical published response content.

13. The system recited in claim 8, wherein:

the dynamic context includes a template;

generating the dynamic context includes:

performing sentiment analysis on the original sentiment content to obtain a determined sentiment; and automatically selecting the template based at least in part on the determined sentiment;

the generative AI tool generates the response content, including by generating a variation of the template; and the response content includes at least part of the variation.

14. A method, comprising:

receiving original sentiment content;

anonymizing the original sentiment content to obtain anonymized sentiment content;

generating dynamic context based at least in part on the anonymized sentiment content and location-based information, including by:

selecting two or more input components from a library of input components that includes two or more of the following: the location-based information, industry-based information, brand guidelines, historical context, environmental context, temperature adjustment, language complexity, or a sentiment processor; and for each of the selected two or more input components, generating a corresponding value, wherein:

the dynamic context includes an objective function which in turn includes a coefficient and a function;

the coefficient of the objective function includes the corresponding value that is generated for each of the selected two or more input components, wherein the coefficient is specific to the selected two or more input component; and the function of the objective function includes each of the selected two or more input components; and generating response content, using a generative AI tool, based at least in part on the dynamic context and the anonymized sentiment content by optimizing the objective function.

15. The method recited in claim 14, further including:

receiving a selection of a selected supervised user;

obtaining historical published response content for the selected supervised user;

generating a score for the selected supervised user using the historical published response content for the selected supervised user;

generating an evaluation report, wherein the evaluation report includes information associated with the score for the selected supervised user; and displaying the evaluation report for the selected supervised user.

16. A method, comprising:

receiving original sentiment content;

anonymizing the original sentiment content to obtain anonymized sentiment content:

generating dynamic context based at least in part on the anonymized sentiment content and location-based information;

generating response content, using a generative AI tool, based at least in part on the dynamic context and the anonymized sentiment content;

receiving a selection of a selected supervised user;

receiving approval, by the selected supervised user, of the generated response content:

publishing the generated response content on a social media platform after receiving the approval by the selected supervised user:

obtaining historical published response content for the selected supervised user, wherein the historical published response content comprises the published generated response content and other approved published responses;

generating a score for the selected supervised user using the historical published response content for the selected supervised user;

generating an evaluation report, wherein:

the evaluation report includes information associated with the score for the selected supervised user;

generating the score for the selected supervised user includes generating an alignment score for the selected supervised user using: (1) the historical published response content for the selected supervised user and (2) a master objective function; and the evaluation report includes the alignment score and one or more selectable objects;

receiving a selection, by a supervising user, of at least one of the one or more selectable objects to obtain historical published responses for the selected supervised user and control a user interface to display the obtained historical published responses; and displaying the evaluation report for the selected supervised user.

17. A method, comprising:

receiving original sentiment content;

anonymizing the original sentiment content to obtain anonymized sentiment content;

generating dynamic context based at least in part on the anonymized sentiment content and location-based information;

generating response content, using a generative AI tool, based at least in part on the dynamic context and the anonymized sentiment content;

receiving a selection of a selected supervised user;

receiving approval, by the selected supervised user, of the generated response content;

publishing the generated response content on a social media platform after receiving the approval by the selected supervised user;

obtaining historical published response content for the selected supervised user, wherein the historical published response content comprises the published generated response content and other approved published responses;

obtaining historical suggested response content for the selected supervised user;

generating a score for the selected supervised user using the historical published response content for the selected supervised user;

generating an evaluation report, wherein:

the evaluation report includes information associated with the score for the selected supervised user;

generating the score for the selected supervised user includes generating a difference score for the selected supervised user using: (1) the historical published response content for the selected supervised user and (2) the historical suggested response content for the selected supervised user; and the evaluation report includes the difference score and one or more selectable objects;

receiving a selection, by a supervising user, of at least one of the one or more selectable objects to obtain historical published responses for the selected supervised user and control a user interface to display the obtained historical published responses; and displaying the evaluation report for the selected supervised user.

18. A method, comprising:

receiving original sentiment content;

anonymizing the original sentiment content to obtain anonymized sentiment content;

generating dynamic context based at least in part on the anonymized sentiment content and location-based information;

generating response content, using a generative AI tool, based at least in part on the dynamic context and the anonymized sentiment content;

receiving approval, by a selected supervised user, of the generated response content;

publishing the generated response content on a social media platform after receiving the approval by the selected supervised user;

receiving a selection of a selected supervised user;

receiving a second selection that includes one or more of the following: a selected brand, a selected store location, or a selected client;

obtaining historical published response content for the selected supervised user, wherein the historical published response content comprises the published generated response content and other approved published responses;

generating a score for the selected supervised user using the historical published response content for the selected supervised user;

generating an evaluation report, wherein the evaluation report includes information associated with the score for the selected supervised user;

filtering the historical published response content using the second selection to obtain targeted historical published response content for the selected supervised user, wherein:

generating the score for the selected supervised user includes generating a targeted score for the selected supervised user using the targeted historical published response content for the selected supervised user; and the evaluation report includes the targeted score and one or more selectable objects;

receiving a selection, by a supervising user, of at least one of the one or more selectable objects to obtain the historical published responses for the selected supervised user and control a user interface to display the obtained historical published responses; and displaying the evaluation report for the selected supervised user.

* * * * *